(12) United States Patent
 Zalewski

(10) Patent No.: US 11,548,702 B2
(45) Date of Patent: Jan. 10, 2023

(54) BEVERAGE CONTAINER CAP WITH SELECTABLE ADDITIVES

(71) Applicant: ZM2 Design, LLC, Belmont, MA (US)

(72) Inventor: Wojciech Zalewski, Belmont, MA (US)

(73) Assignee: ZM2 Design, LLC, Belmont, MA (US)

( * ) Notice: Subject to any disclaimer, the term of this patent is extended or adjusted under 35 U.S.C. 154(b) by 0 days.

(21) Appl. No.: 17/597,092

(22) PCT Filed: Jun. 26, 2020

(86) PCT No.: PCT/US2020/039914
 § 371 (c)(1),
 (2) Date: Dec. 26, 2021

(87) PCT Pub. No.: WO2020/264365
 PCT Pub. Date: Dec. 30, 2020

(65) Prior Publication Data
 US 2022/0242631 A1  Aug. 4, 2022

Related U.S. Application Data

(60) Provisional application No. 62/878,988, filed on Jul. 26, 2019, provisional application No. 62/867,461, filed on Jun. 27, 2019.

(51) Int. Cl.
 *B65D 51/28* (2006.01)
 *A23L 2/56* (2006.01)
(52) U.S. Cl.
 CPC ............ *B65D 51/2835* (2013.01); *A23L 2/56* (2013.01)

(58) Field of Classification Search
 CPC ........... B65D 81/3266; B65D 51/2807; B65D 51/2814; B65D 51/2821; B65D 51/2835
 USPC ................ 206/219, 222; 220/265, 521, 522; 215/250, 252
 See application file for complete search history.

(56) References Cited

U.S. PATENT DOCUMENTS

| 6,874,551 | B1 * | 4/2005 | Snell ................... B01F 35/7131 141/2 |
| 8,613,372 | B2 | 12/2013 | Porter |
| 9,290,309 | B1 | 3/2016 | Pabon |

(Continued)

FOREIGN PATENT DOCUMENTS

| JP | 10139075 A | 5/1998 |
| JP | 2010189062 A | 1/2010 |
| WO | 2007053875 A1 | 5/2007 |

*Primary Examiner* — Steven A. Reynolds
(74) *Attorney, Agent, or Firm* — Altman & Martin; Steven K Martin

(57) ABSTRACT

A cap (10) for adding additives to a container. The base (12) is a round platform (20) with a vertical axis (18), a container attachment (30), a series of truncated sawteeth (60) extending around the perimeter (36), a through aperture (80) between the bottom and top surfaces, and a spike (84) extending from the aperture. A cylindrical tank (14) has sealed compartments (110) filled with additives arranged in a circle around the axis. A mechanism (16, 32) holds the base and tank together and biases the tank to the base. As the tank rotates, cogs (144) in the tank slide up the tooth ramps (64) to push the tank away from the platform until the cogs reach the tooth plateaus (66). The cogs pass the plateaus where the tank is pulled toward the platform and the spike punctures a seal covering an opening in the aligned compartment.

14 Claims, 36 Drawing Sheets

(56) References Cited

U.S. PATENT DOCUMENTS

| | | | |
|---|---|---|---|
| 2002/0050461 A1* | 5/2002 | Vlodek | B65D 51/2835 |
| | | | 222/630 |
| 2008/0000898 A1 | 1/2008 | Ramsden | |
| 2008/0041738 A1* | 2/2008 | O'Donnell | B65D 51/2828 |
| | | | 206/219 |
| 2010/0044377 A1 | 2/2010 | Porter | |
| 2011/0068102 A1 | 3/2011 | Porter | |
| 2012/0111744 A1 | 5/2012 | Chen et al. | |
| 2015/0028037 A1 | 1/2015 | Porter | |
| 2016/0052685 A1 | 2/2016 | Estes et al. | |
| 2016/0317985 A1 | 11/2016 | Mutschler et al. | |
| 2018/0178957 A1 | 6/2018 | Zalewski | |

\* cited by examiner

BEVERAGE CONTAINER CAP WITH SELECTABLE ADDITIVES

TECHNICAL FIELD

The present invention relates to beverages, more particularly, to a device for putting selected additives in a beverage.

BACKGROUND ART

Prior bottle caps have been used for sealing the container only. Some caps have the capacity to insert one liquid into the container. This is usually done to add a liquid that needs to be combined at the last minute before drinking. A bottle cap that can provide multiple liquids into a container has always been an unfulfilled need. This type of cap would give people a choice of how they can drink or use the liquid in the container/bottle. Liquids may be used in a discretionary manner. This can also provide a mixture that cannot be bought off the shelf. An example of this would be half a dose sugar and double dose of caffeine.

DISCLOSURE OF THE INVENTION

The present invention is a cap for containers that permits the user to select additives to add to the contents. The cap has a base, a tank, and a mechanism for attaching the base and tank.

In one configuration, the base is a round, flat platform with an imaginary axis that extends vertically through the center. In another configuration, the platform is cylindrical, and the axis extends through the axis of the cylinder. The bottom of the platform has a container attachment. In one configuration, the platform screws or snaps onto the container. In another configuration, the platform sits on the container and is held there by finger grips that the user holds.

A series of teeth extend around the perimeter of the platform. The profile of a tooth is that of a truncated sawtooth, a sawtooth with a flat upper end. The valley between teeth is generally flat, ending at a ramp that extends upwardly at an angle to a flat plateau. The other end of the plateau drops at a vertical wall to the next valley.

A through aperture extends between the platform bottom and top surfaces. A spike extends from the top surface opening.

The tank is cylindrical and divided by a region wall into a compartment region at the upper part of the tank and a platform region. In one configuration, the region wall extends horizontally. In another configuration, the region wall extends horizontally at the bottom the tank and up the sides of the tank. The platform region is within an annular groove extending around the perimeter of the region wall.

The compartment region has a number of dividing walls that separate the compartment region into compartments filled with additives. The compartments and one or more vacant locations are arranged in a circle around an axial through hole on the axis. Typically, the dividing walls extend radially from and parallel to the axis so that the compartments and vacant locations are wedge-shaped.

The top of the tank is closed to seal the compartments. The tank can be formed with the top already closed. The tank can have a separate cover that is, optionally, part of the attachment mechanism.

The region wall operates as the floor of the compartments, each with a through opening covered by a frangible seal that can be pierced by the spike. In one configuration, the seal is a thin sheet of foil or plastic adhered to the bottom of the region wall. Alternatively, the seal can be molded as a thin barrier from the tank material.

In one configuration, the platform fits into the platform region, and rotates about the axis within the platform region. Cogs on the bottom of the region wall ride on the teeth. In another configuration, the region wall fits into the platform cylinder with the teeth in the annular groove of the platform region. Cogs in the groove ride on the teeth.

The tank is attached to the base by an attachment mechanism so that the tank can rotate about and reciprocate relative to the base on the axis. Most attachment mechanisms have a pin with the head and shaft. The shaft extends downwardly through an axial hole in the tank with the head abutting the top of the tank. The end of the shaft is fixed either to the platform of by a fastener below the platform. Another attachment mechanism is the reverse, a shaft with a head extends upwardly through an axial hole in the platform and an axial hole in the tank with the head abutting the bottom of the platform. The end of the shaft is fixed to the top of the tank.

When the tank is biased by the biasing mechanism against the base so that the cogs are against the valleys between the teeth, the cap is in the operative position. In the operative position, a compartment opening is fully aligned with the platform aperture and the spike extends through the compartment opening. The biasing mechanism can take several different forms. In one, the tank is biased against the base by gravity because the container is upright. In another, the tank is manually pushed against the base by the user. In another, a spring pushes the tank against the cap, and there are several forms of spring-based biasing mechanisms.

The cogs ride on the teeth as the tank is rotated relative to the base. When the tank is rotated from the operative position while being acted upon by the biasing mechanism, the cogs slide up the tooth ramps to push the tank away from the platform until the cogs reach the plateaus. At this point, the tank is in the selecting position where no compartment opening is fully aligned with the platform aperture and the spike is not in a compartment opening. As the tank continues to rotate, the cogs pass the plateaus and reach the vertical walls, where the biasing mechanism causes the tank to fall toward the platform to the operative position until the cogs are resting on the valleys. As the tank falls, the spike punctures the seal of the compartment aligned with the aperture allowing the additive to flow into the aperture, through the container attachment, and into the container. When a vacant location is aligned with the aperture, the cap is in a position for transportation and storage.

In one configuration of the biasing mechanism, the head of the attachment mechanism pin is composed of a somewhat flexible material. When the tank is in the operative position, the head is substantially unflexed and in its quiescent state. When the tank is rotated and pulls away from the base, the head deforms inwardly. The shaft, in essence, becomes longer, allowing the tank to reciprocate away from the platform. When the cog reaches the vertical wall, the head returns to its quiescent state, pulling the tank down to the base.

In another configuration, a stretched coil spring within the tank axial hole in its quiescent state holds the tank in the operative position. When the tank is rotated and pulls away from the base, the spring is stretched more. When the cogs reaches the vertical walls, the spring returns to its quiescent state, pulling the tank down to the base.

There are several configurations of the cap modified to inject carbon dioxide ($CO_2$) into the container.

In one configuration, a $CO_2$ cartridge mounts in a cartridge canister that attaches to the top of the tank. A $CO_2$ valve screws onto the cartridge that is actuated by depressing a plunger. The plunger is manually pushed by a button at the top of the canister. The valve outlet is connected to a hollow in the shaft that extends downwardly through the platform and into the container. The cartridge sits on a rigid plate above the shaft head that covers the tube and shaft hollow.

Pushing the button pushes the combination of the cartridge, valve, and shaft downwardly. When pushed fully downwardly, the valve opens to inject $CO_2$ into the shaft hollow and the tank can be rotated on the base to the next compartment. When the button is released, the valve closes and the compartment is pierced.

In another configuration, the cartridge is not mounted over the shaft, which separates the additive and $CO_2$ injection functions.

Objects of the present invention will become apparent in light of the following drawings and detailed description of the invention.

BRIEF DESCRIPTION OF DRAWINGS

For a fuller understanding of the nature and object of the present invention, reference is made to the accompanying drawings, wherein:

FIG. 42 is a side, cross-sectional view of the cap with a flexible head with the head pushed/pulled in;

BEST MODE(S) FOR CARRYING OUT THE INVENTION

The present invention is a cap 10 for bottles, cans, or other containers (collectively, "container") that permits the user to select one or more of a number of additives to add to the contents of the container. Additives can include sugar, artificial sweetener, caffeine, vitamins, electrolytes, flavorings, medicines, CBD, etc. The additives can be any materials that flows easily by gravity. Examples include liquids and/or solids such as powders. Additives can be components of multi-part compounds, such as a two-part epoxy.

The cap 10, shown in the figures, has a base 12, a tank 14, and a mechanism 16 for attaching the base 12 and tank 14.

Figure 7:
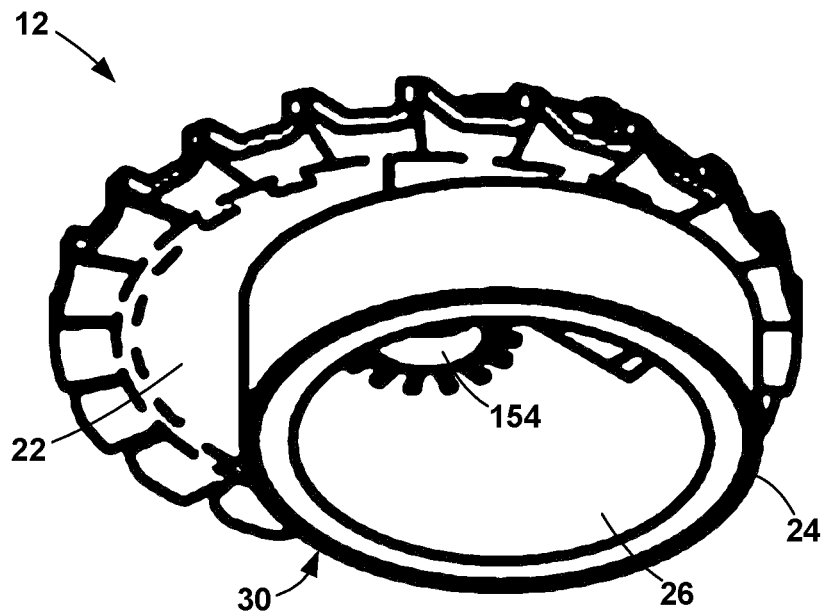
FIG. 7 is a bottom, perspective view of the base of FIG. 3.
Figure 8:
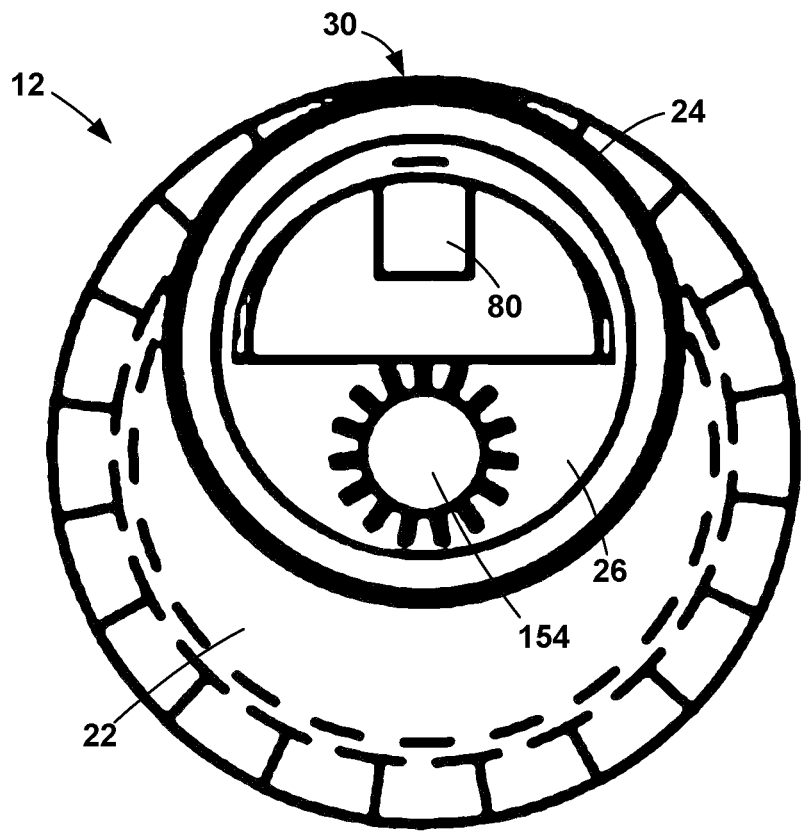
FIG. 8 is a bottom view of the base of FIG. 7.
Figure 10:
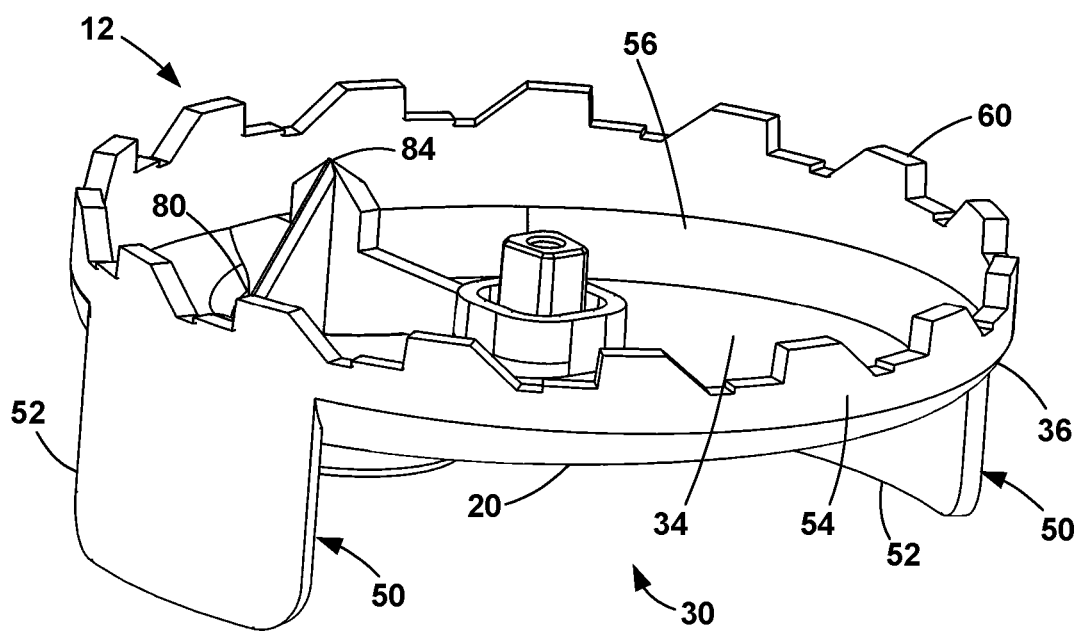
FIG. 10 is a top, perspective view of the base of FIG. 4B.
Figure 11:
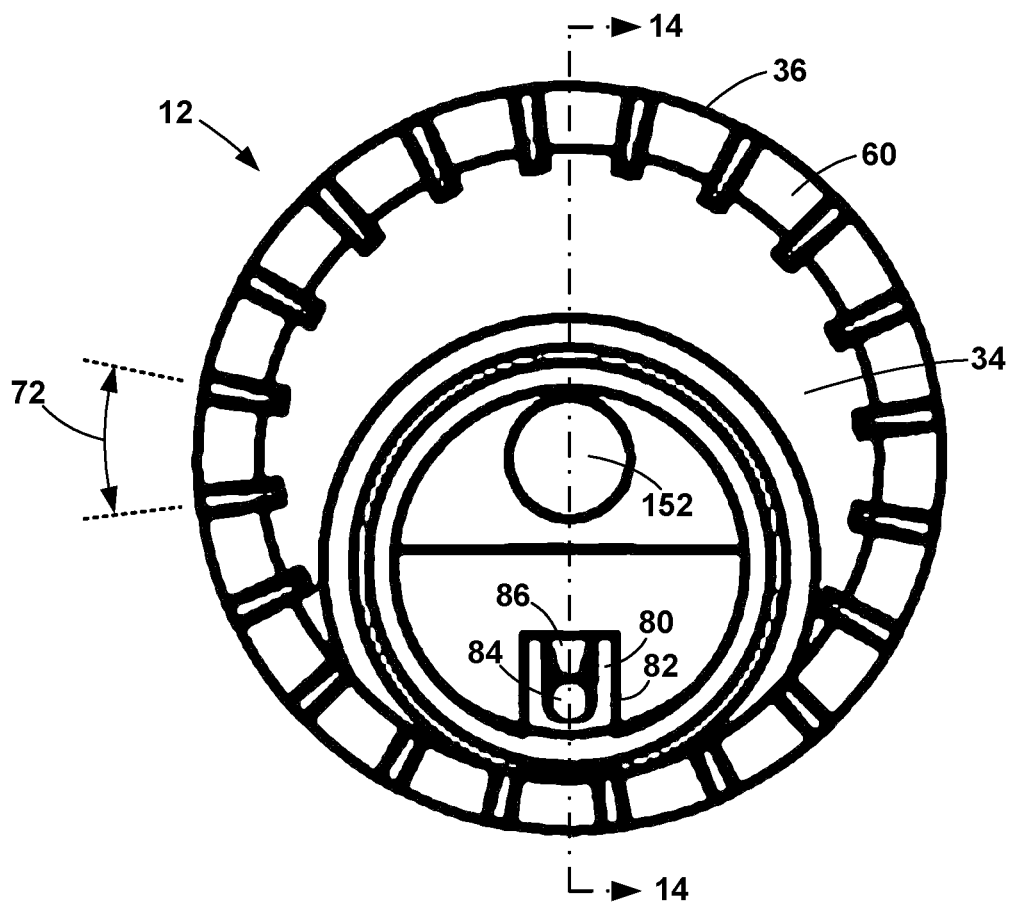
FIG. 11 is a top view of the base of FIG. 7.
Figure 12:
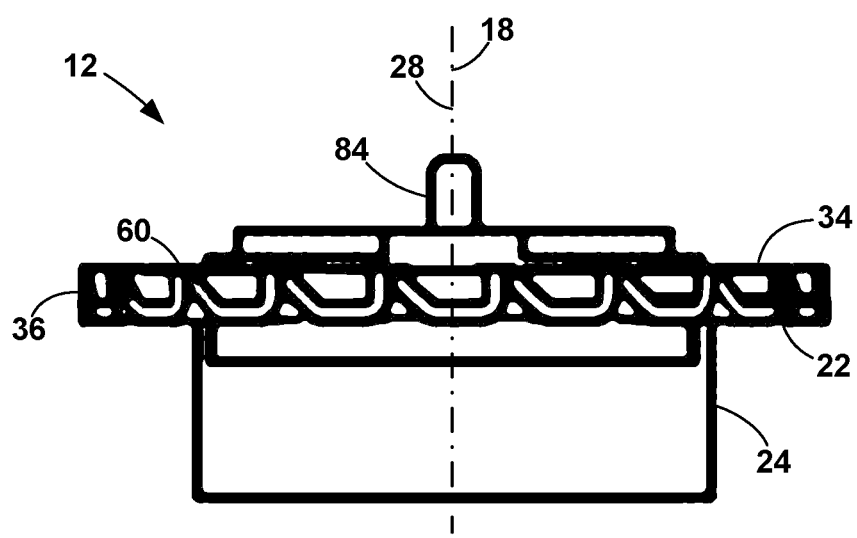
FIG. 12 is a side view of the base of FIG. 7.
Figure 15:
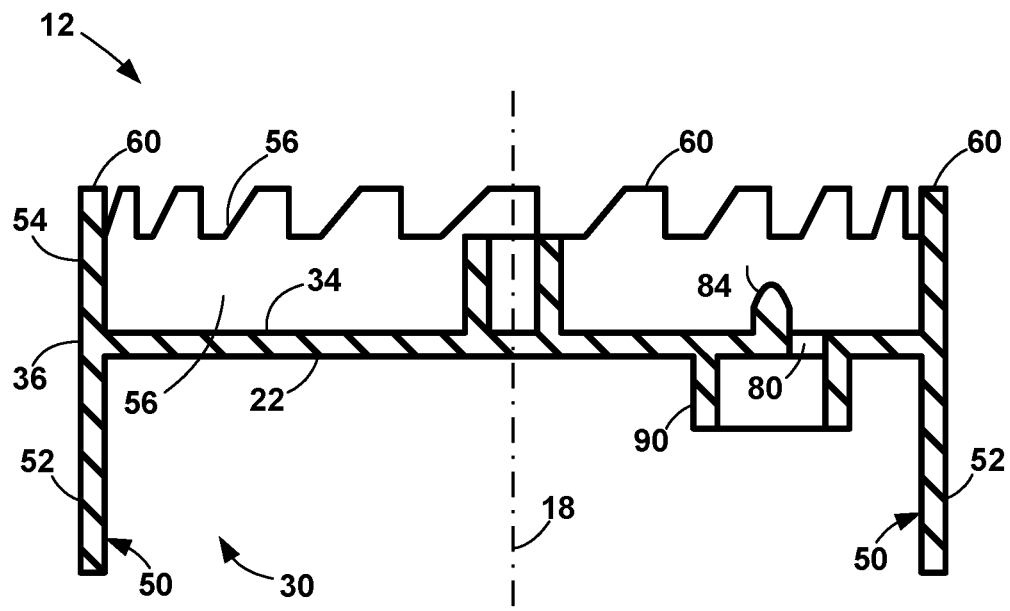
FIG. 15 is a side, cross-sectional view of the base of FIG. 10.

In the configuration of FIGS. 7 and 8, the base 12 is a round platform 20 that is generally flat. An imaginary axis 18 extends vertically through the center of the platform 20. In the configuration of FIGS. 10 and 15, the platform 20 is cylindrical and the axis 18 extends through the axis of the cylinder. A wall 54 extends upwardly around the perimeter 36 of the platform 20 and that forms a tray 56 above the platform 20.

The bottom 22 of the platform 20 has a container attachment 30. In one configuration, a cylinder 24 extends downwardly from the platform bottom 22 offset from the axis 18. The cylinder 24 has a cylindrical cavity 26 with an axis 28 parallel to and offset from the base axis 18 for attachment to the container. The size of the cavity 26 depends on the size of the container opening for which the cap 10 is intended to be used. It can be small for soda bottles or large for large-mouth jars and soda cans.

Figure 16:
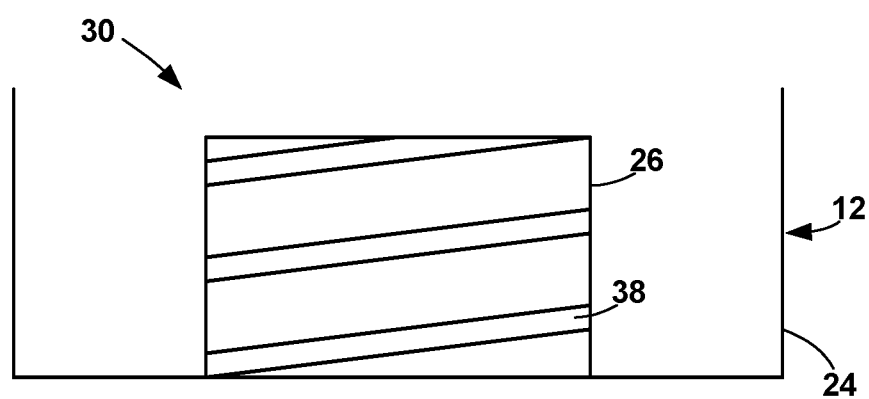
FIG. 16 is a side, cross-sectional view of the cavity with a first container attachment mechanism.
Figure 17:
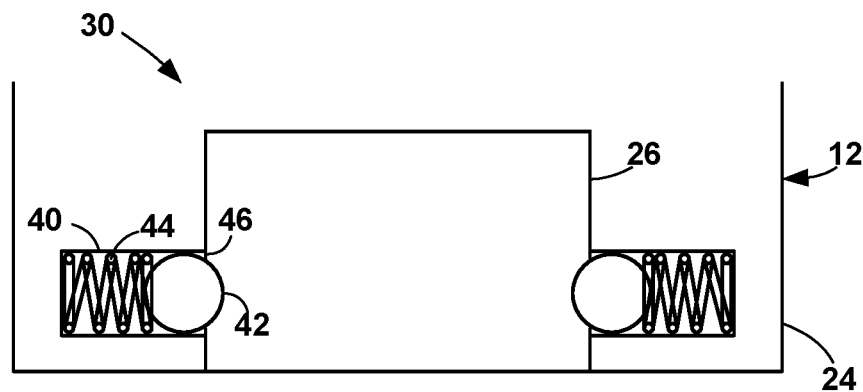
FIG. 17 is a side, cross-sectional view of the cavity with a second container attachment mechanism.
Figure 18:
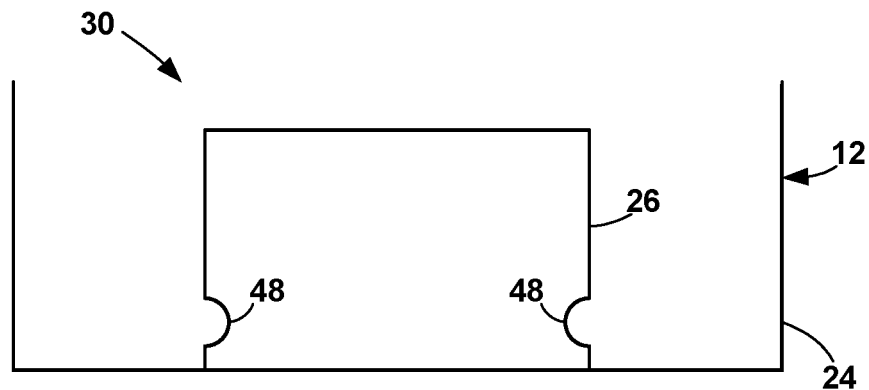
FIG. 18 is a side, cross-sectional view of the cavity with a third container attachment mechanism.
Figure 19:
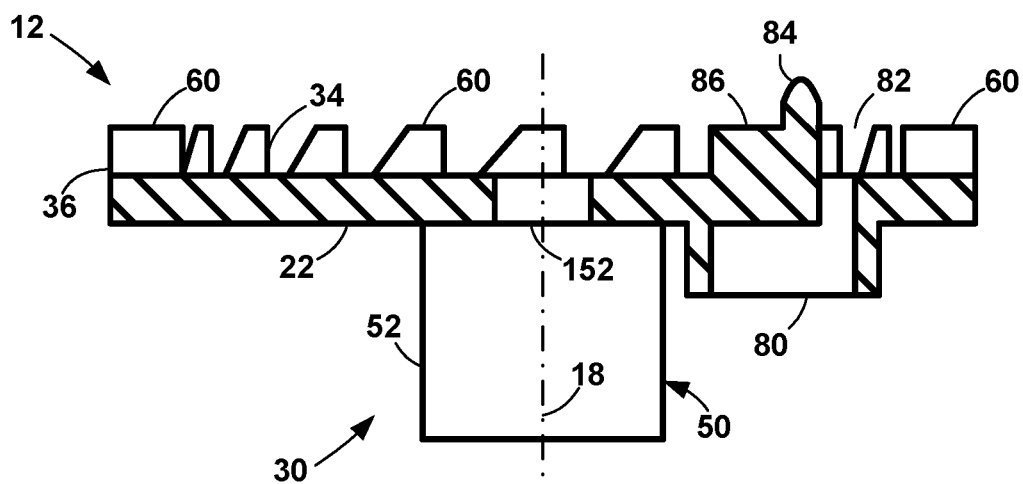
FIG. 19 is a side, cross-sectional view of the base with finger tabs.
Figure 20:
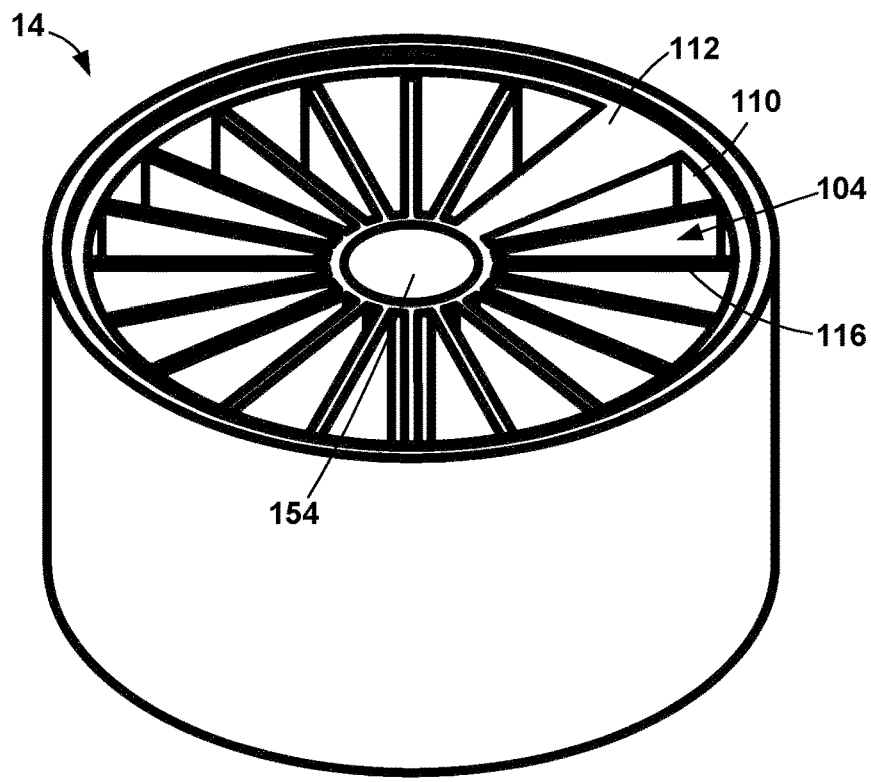
FIG. 20 is a top, perspective view of the tank.
Figure 21:
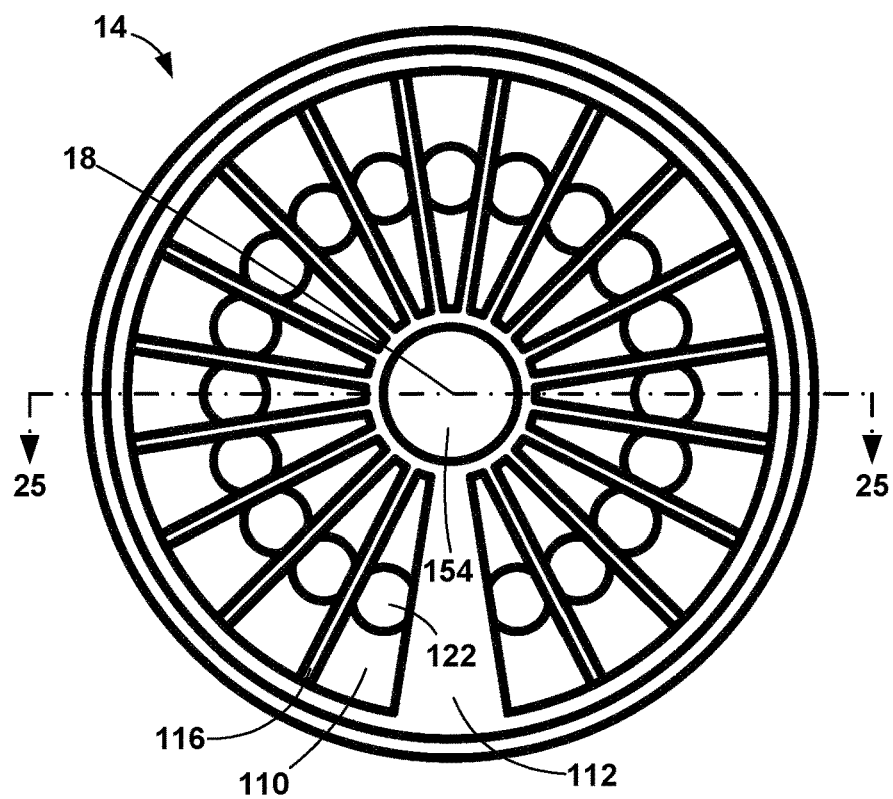
FIG. 21 is a top view of the tank.
Figure 22:
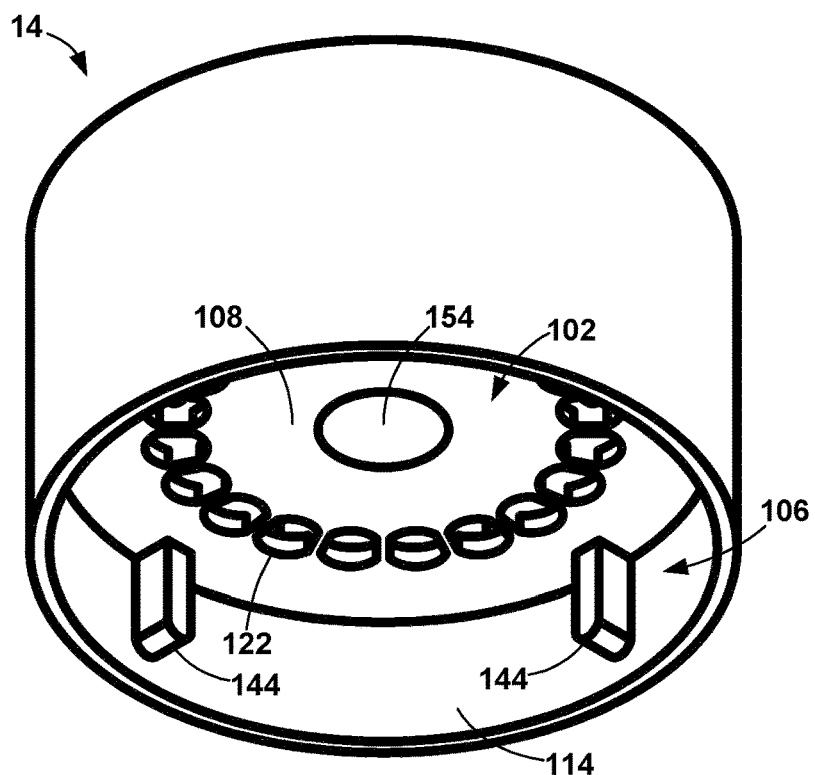
FIG. 22 is a bottom, perspective view of the tank.
Figure 23:
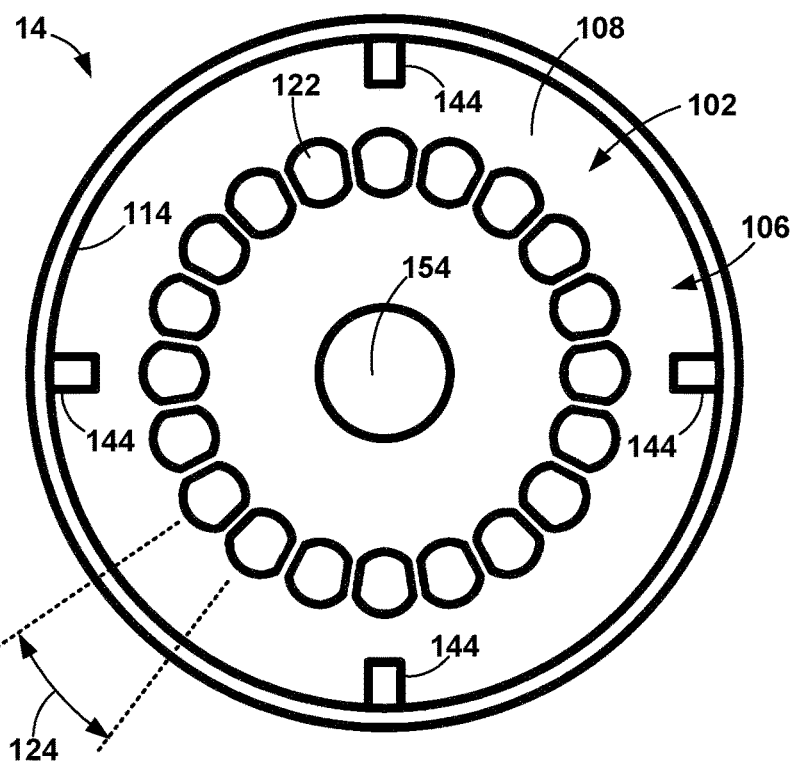
FIG. 23 is a bottom view of the tank.
Figure 24:
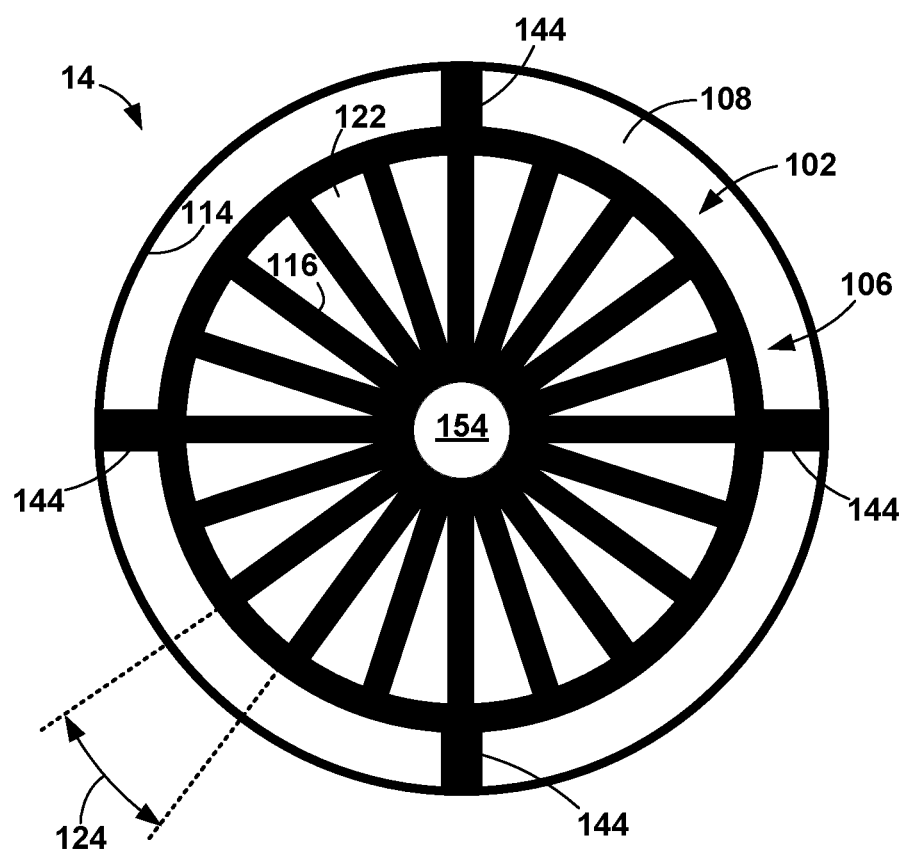
FIG. 24 is a bottom view of an alternate configuration of the tank.

Typically, the cavity 26 will be threaded, as at 38 in FIG. 16, so that the cap 10 can be screwed on to a threaded container opening. However, the present invention contemplates that the cavity 26 can be designed with other means of attachment that depend on the type of container the cap 10 is designed to be used with. In FIG. 17, the cavity 26 has opposed holes 40, each with a ball bearing 42 biased outwardly by a spring 44. Annular walls 46 retain the ball bearings 42 in the holes 40. When the cap 10 is pushed onto a container, the ball bearings 42 are pushed into the holes 40 against the springs 44 and then snap out when the rim of the container passes. In FIG. 18, the cavity 26 has an annular ring 48 that can compress. When the cap 10 is pushed onto the container, the ring 48 compresses and then snaps back when the rim of the container passes.

A different form of container attachment 30 is shown in FIGS. 5, 10, 15, and 19. Rather than a cylinder 24 with a cavity 26, a pair of opposed finger grips 50 extend downwardly from the perimeter of the platform bottom 22. The finger grips 50 can be discrete finger tabs 52 or on a skirt that extends around the platform 20. Other similar configurations can be employed. The cap 10 is placed so that the platform bottom 22 rests on the container opening with the finger grips 50 straddling the sides of the container. The cap 10 is held in place by manually holding the finger grips 52 to maintain the cap 10 on the container as it is being used. Optionally, the finger grips 50 are textured to facilitate a more secure grip by the user.

Figure 1:
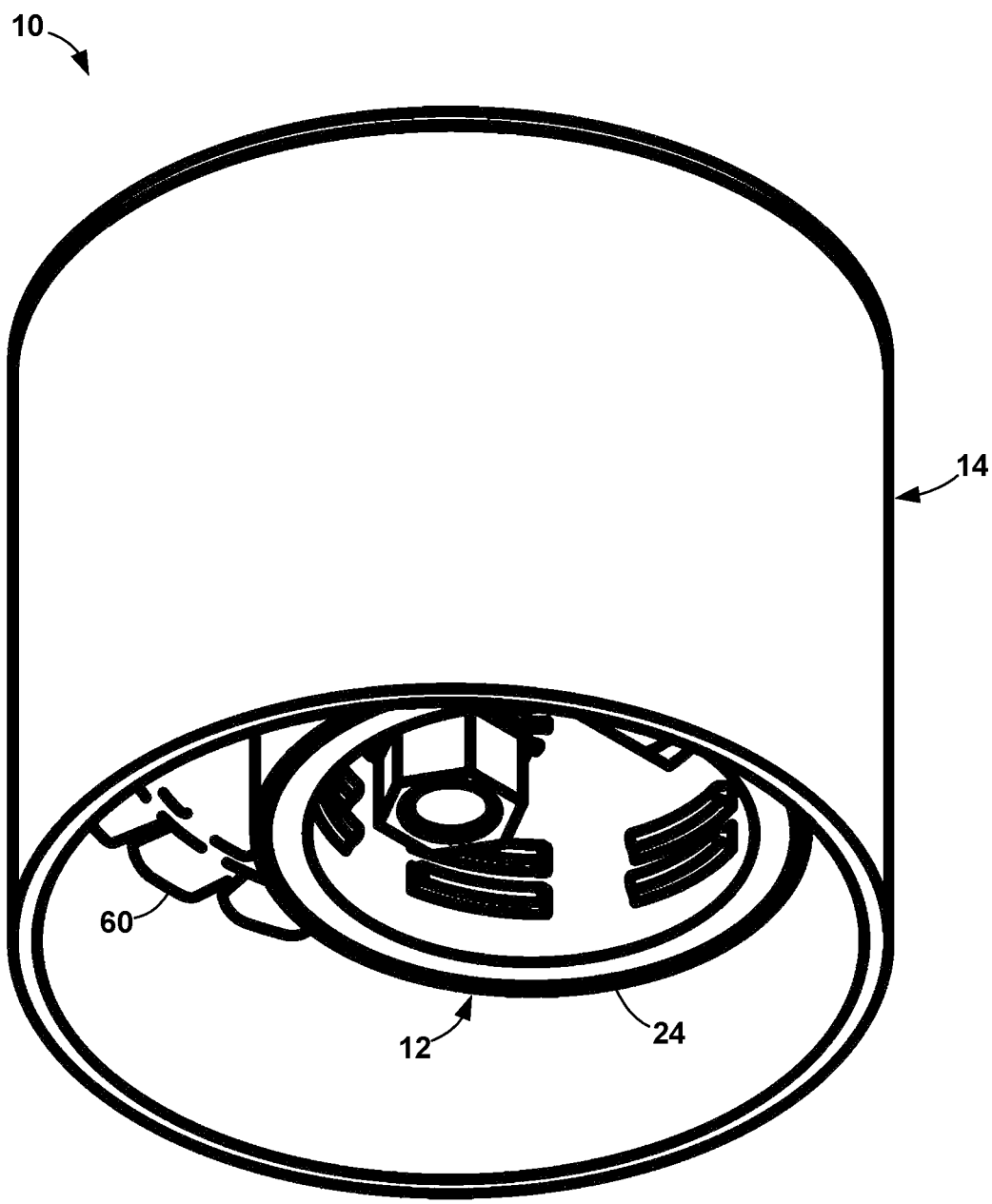
FIG. 1 is a bottom, perspective view of one configuration of the cap of the present invention.
Figure 2:
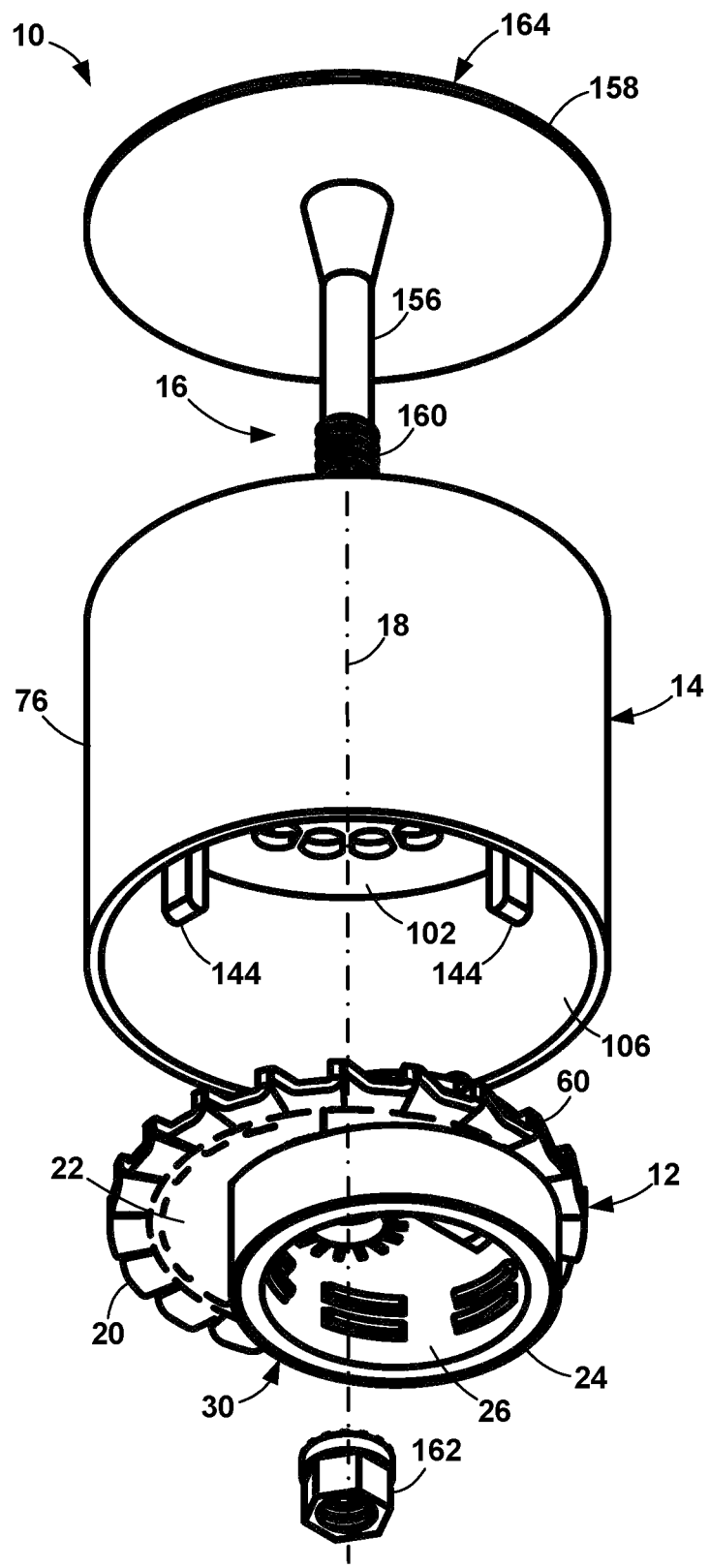
FIG. 2 is an exploded, bottom, perspective view of the cap of FIG. 1.
Figure 3:
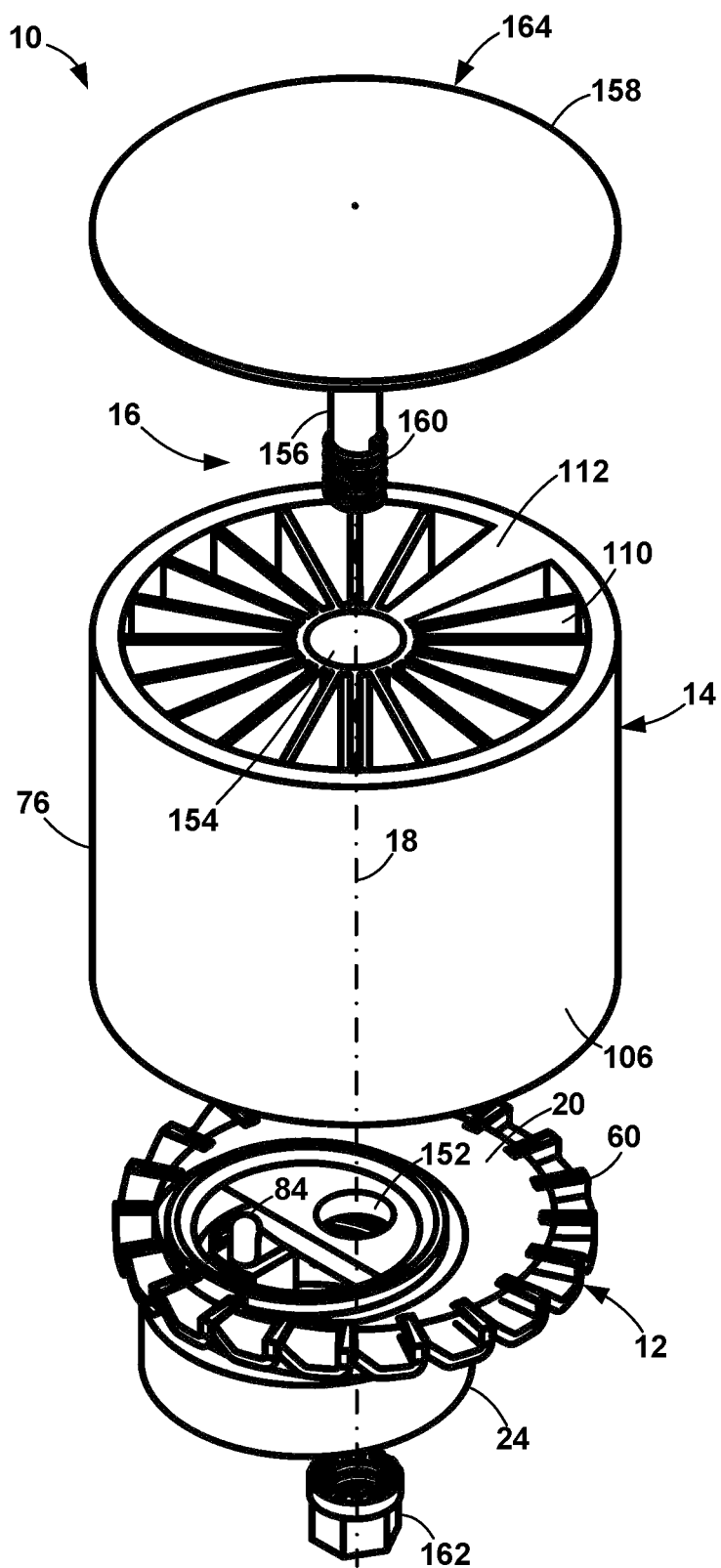
FIG. 3 is an exploded, top, perspective view of the cap of FIG. 1.
Figure 4:
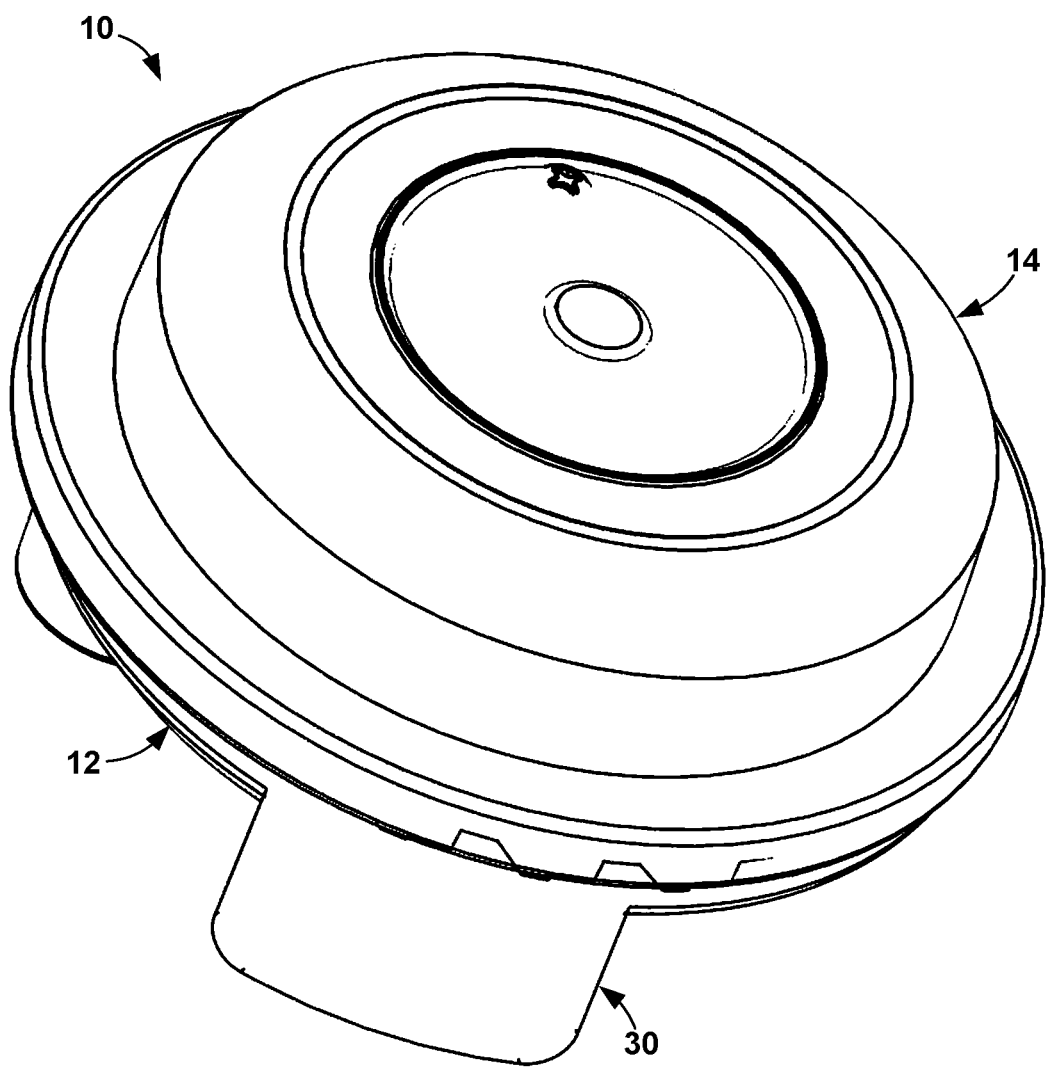
FIG. 4 is a top, perspective view of another configuration of the cap of the present invention.
Figure 5:
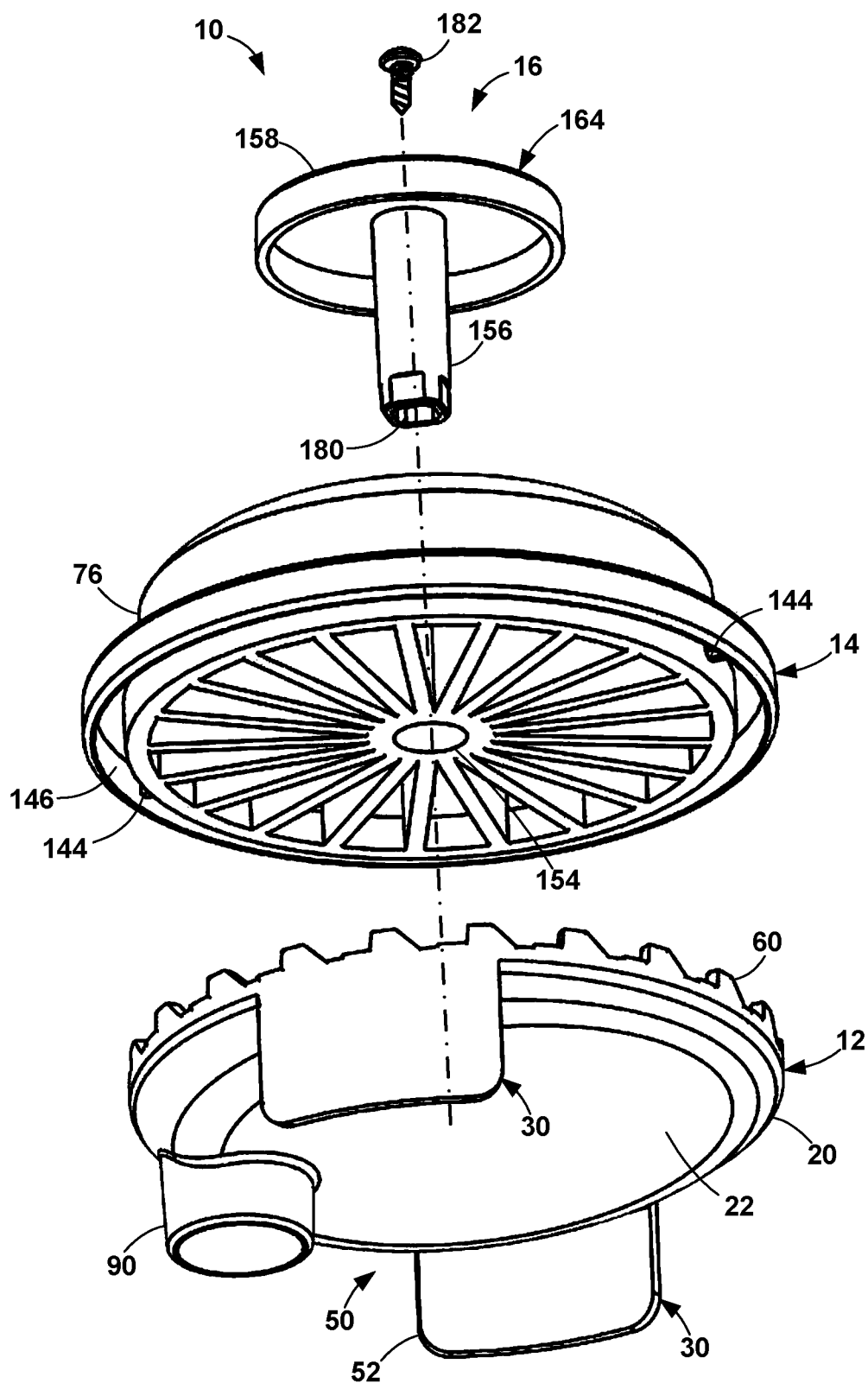
FIG. 5 is an exploded, bottom, perspective view of the cap of FIG. 4.
Figure 6:
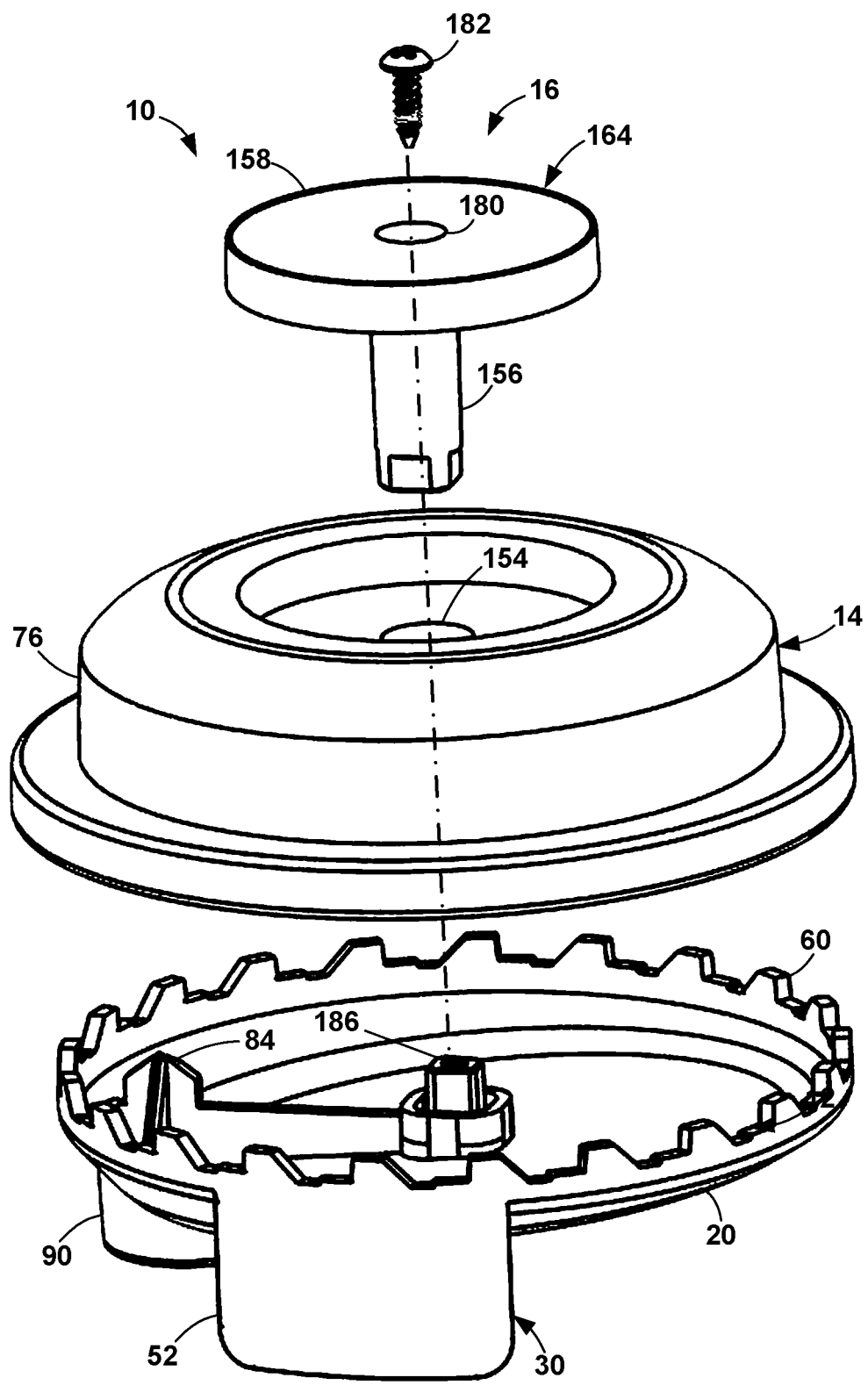
FIG. 6 is an exploded, top, perspective view of the cap of FIG. 4.

Optionally, a mouth 90 in the form of a small cylinder extends from the platform bottom 22, as in FIGS. 5 and 15. The mouth 90 surrounds the aperture 80 and is long enough to extend into the container. The mouth 90 helps to guide the additive into the container, rather than having some splash outside the container. This design is particularly useful for soda cans, where the can opening is only a small portion of the top of the can. The cap 10 is rotated so that the mouth 90 is aligned with the can opening before the cap 10 is set on the can.

As shown in FIGS. 9-12, a series of teeth 60 extend around the perimeter 36 of the top surface 34 of the platform 20. In the configuration of FIGS. 9, 11, 12, and 14, the teeth 60 extend directly from the top surface 34. In the configuration of FIGS. 10 and 15, the teeth 60 extend from the top of the perimeter wall 54.

Figure 13:
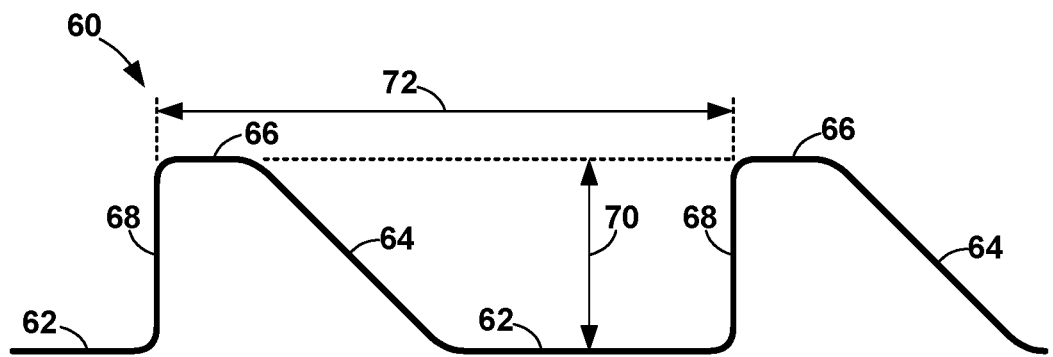
FIG. 13 is a detail side view of the platform teeth.
Figure 14:
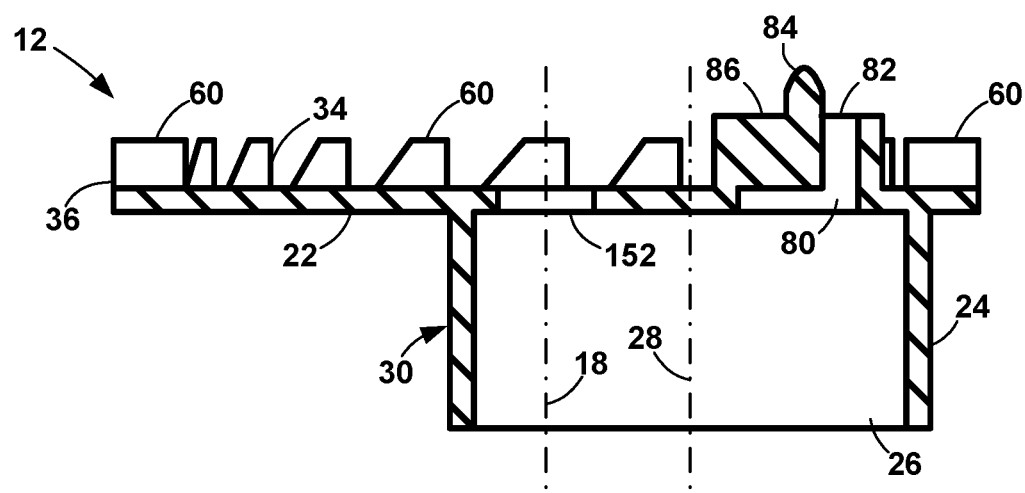
FIG. 14 is a side, cross-sectional view of the base of FIG. 5 taken at 14-14 in FIG. 11.

A profile of two teeth 60 is shown in FIG. 13. The profile is that of a truncated sawtooth, that is, a sawtooth with a flat upper end. More particularly, the valley 62 between teeth 60 is generally flat or has a slight drop. At one end of the valley 62, a ramp 64 extends upwardly at an angle in the range of from approximately 30° to approximately 60° to a flat plateau 66. The other end of the plateau 66 drops at a vertical wall 68 to the next valley 62. Although the figures show the ramp 64 extends upwardly to the left, the present invention contemplates that the ramp 64 can extend upwardly to either the left or right. In the claims, this shape in either direction is referred to as a flat sawtooth. Because the teeth 60 are around a circular perimeter, the separation 72 between adjacent teeth 60 is an angular displacement, and is described below.

Extending between the platform bottom surface 22 and the platform top surface 34 is a through aperture 80. The opening 82 of the aperture 80 on the platform top surface 34 is just inwardly of the teeth 60 toward the axis 18.

Extending from the opening 82 and paraxial to the axis 18 is a spike 84. In the present design, the spike 84 is attached to an arm 86 extending from the wall of the aperture 80. The operation of the spike 84 is described below.

Figure 25:
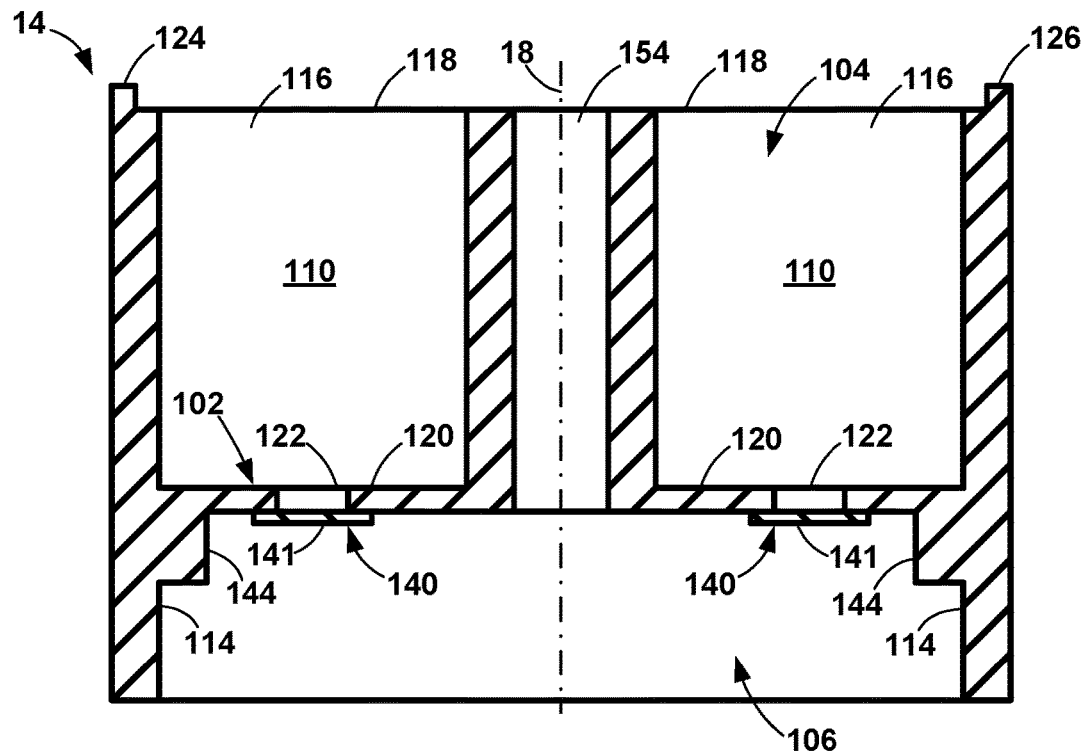
FIG. 25 is a side, cross-sectional view of the tank taken at 25-25 in FIG. 21.
Figure 26:
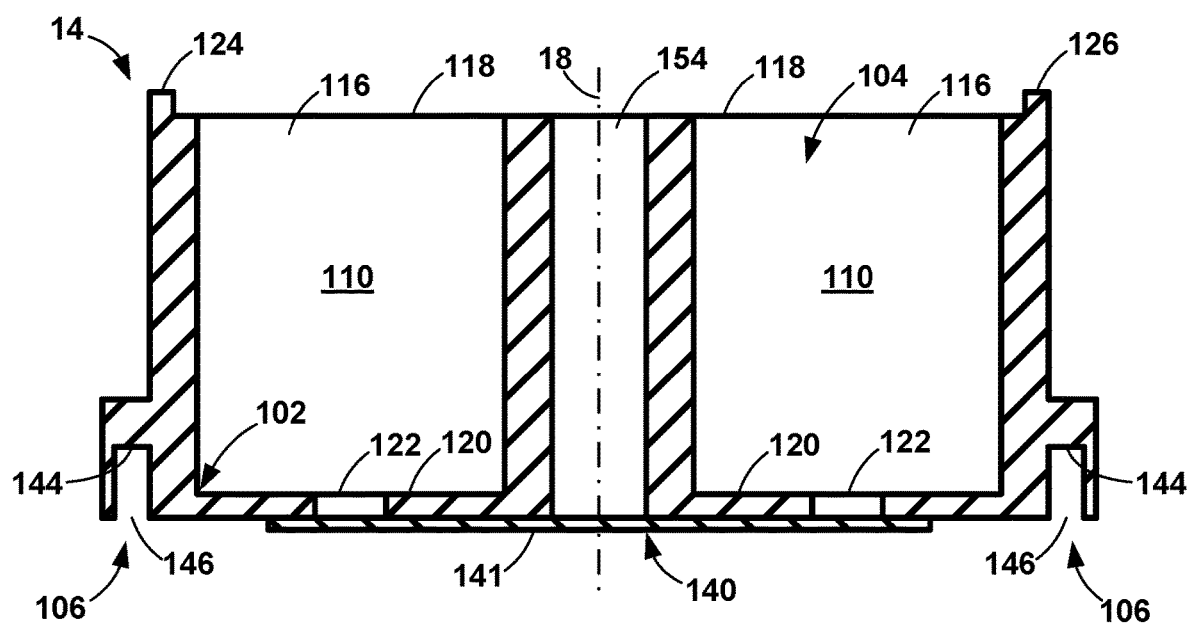
FIG. 26 is a side, cross-sectional view of the tank of FIG. 4B.

The tank 14, shown in FIGS. 20-25, is cylindrical. The tank 14 is divided by a region wall 102 into a compartment region 104 at the upper part of the tank 14 and a platform region 106. The orientation and position of the region wall 102 depends on the configuration of the tank 14. In the configuration of FIG. 25, the region wall 102 extends horizontally and into/out of the sheet. The region wall 102 is positioned in the interior of the tank 14 so that the compartment region 104 is in the upper part of the tank 14 and the platform region 106 is in the lower part of the tank 14. In the configuration of FIG. 26, the region wall 102 extends horizontally and into/out of the sheet at the bottom the tank 14, and up the sides of the tank 14. The platform region 106 is within an annular groove 146 extending around the perimeter of the region wall 102.

Inside the compartment region 104 are a number of dividing walls 116 that separate the compartment region 104 into compartments 110. The compartments 110 may be filled with additives that the user may wish to add to the contents of the container. The compartments 110 and one or more vacant locations 112, described below, are arranged in a circle around an axial through hole 154 on the axis 18, as in FIG. 21. Each compartment 110 has a shape and size to hold a predetermined amount of an additive. Typically, the dividing walls 116 extend radially from and parallel to the axis 18 so that the compartments 110 and vacant locations 112 are wedge-shaped, as in FIG. 21. However, the present invention contemplates that the compartments 110 can be other shapes. Typically, all of the compartments 110 and vacant locations 112 are the same size but may be different sizes depending on the particular application.

Figure 28:
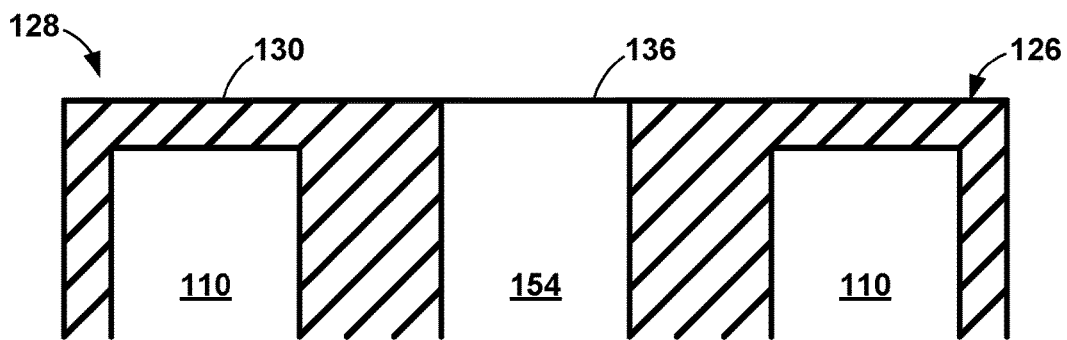
FIG. 28 is an exaggerated, side, cross-sectional view of the closed upper portion of the tank.
Figure 29:
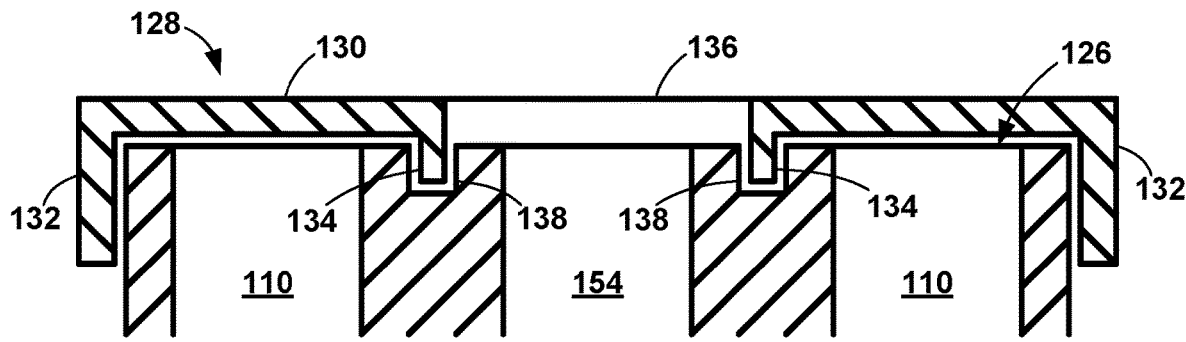
FIG. 29 is an exaggerated, side, cross-sectional view of the upper portion of the tank with a first configuration of a tank cover.

The top 126 of the tank 14 is closed to seal the additives into the compartments 110. The closure 126 can take several different forms. In one, shown in FIG. 28 the tank 14 is formed with the top 126 already closed. In another, the tank 14 is formed with the top 126 open and a cover 130 is attached, as in FIGS. 29 and 30, typically after the compartments 110 are filled with the additives. In one configuration, shown in FIG. 29, the tank cover 130 has a diameter that is slightly larger than the outside diameter of the tank 14 and a wall 132 that extends down the outside of the tank 14.

Optionally, an annular tongue 134 that surrounds a cover hole 136 extends downwardly into an annular groove 138 in the tank 14 to achieve a better seal. The tank cover 130 is attached to the tank 14 in such a way as to form a liquid-tight seal. Any method of forming the seal can be used, including adhesive and welding.

Figure 30:
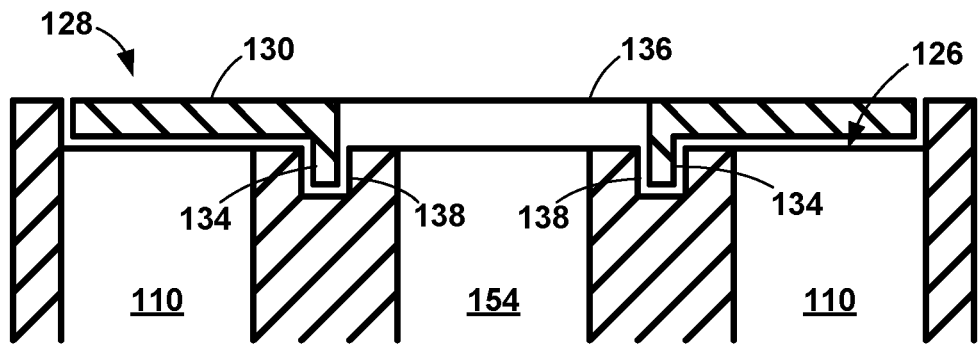
FIG. 30 is an exaggerated, side, cross-sectional view of the upper portion of the tank with a second configuration of a tank cover.

In another configuration of the cover 130, shown in FIG. 30, the compartment dividing walls 116 are shorter than the top 126 of the tank 14 and the diameter of the tank cover 130 is the same as the inside diameter of the tank 14. The tank cover 130 fits into the tank 14 to abut the dividing walls 116 and is attached to the tank 14 to form a liquid-tight seal. Optionally, the cover 130 and tank 14 can have the tongue 134 and groove 138 described above. Any method of forming the seal can be used.

In another closure 126, the head 158 of the shaft 156 of the attachment mechanism 16 covers the tank 14, as described below.

The region wall 102 operates as the floor 120 of the compartments 110 and each compartment floor 120 has a through opening 122. In one configuration, shown in FIGS. 21-23, the opening 122 covers only part of the floor 120. Alternatively, the opening 122 covers the entire floor 120, as in FIG. 24.

The opening 122 is covered by a frangible seal 140 that can be pierced by the spike 84. Preferably, the seal 140 is designed so that, when pierced as described below, it does not break into pieces that end up in the container.

In one configuration, the seal 140 is a thin sheet 141 of foil or plastic. In one configuration, a separate sheet 141 of seal material is used for each opening 122, as in FIG. 25. In another configuration, a single sheet 141 of seal material that covers all of the openings 122 is used, as in FIG. 26. The sheet 141 is attached to the region wall 102, either to the bottom 108 of the region wall 102, to the compartment walls 116, and/or to the compartment floor 120, by whatever means is appropriate, for example, by an adhesive. If the tops 118 of the compartments 110 are closed, the compartments 110 are filled with the additives prior to attaching the sheet 141.

Figure 27:
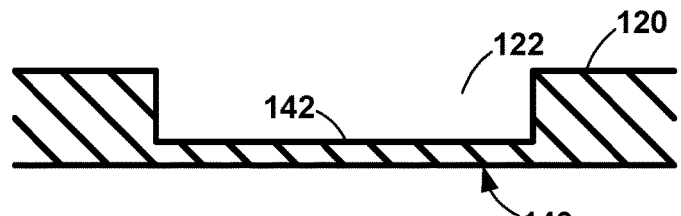
FIG. 27 is a detail, cross-sectional view of a compartment opening.

Alternatively, the seal 140 can be molded as a thin barrier 142 from the tank material, as in FIG. 27. The thin barrier 142 can be anywhere within the opening 122, and is shown at the bottom of the opening 122 in FIG. 27.

Figure 32:
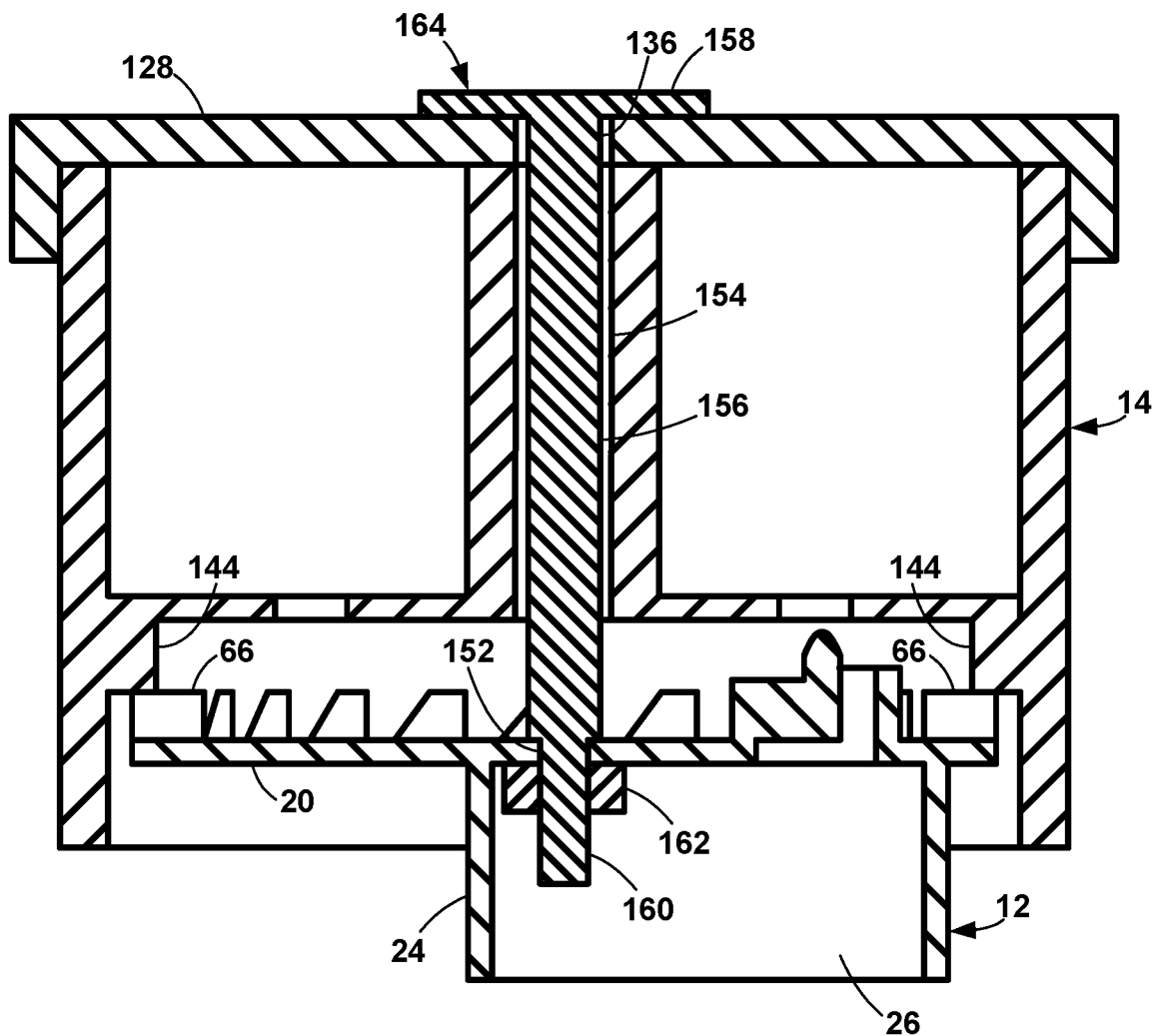
FIG. 32 is a side, cross-sectional view of the cap showing a first attachment mechanism.

In the tank configuration of FIG. 25, with the platform region 106 below the compartment region 104, the platform 20 fits within the platform region 106, as can be seen in FIG. 32, and rotates about the axis 18 within the platform region 106. One or more cogs 144 at the junction of the platform region wall 114 and the region wall bottom 108 ride on the teeth 60, as described below. The platform 20 fits into the platform region 106 such that the cogs 144 touch valleys 62 between the teeth 60.

Figure 31:
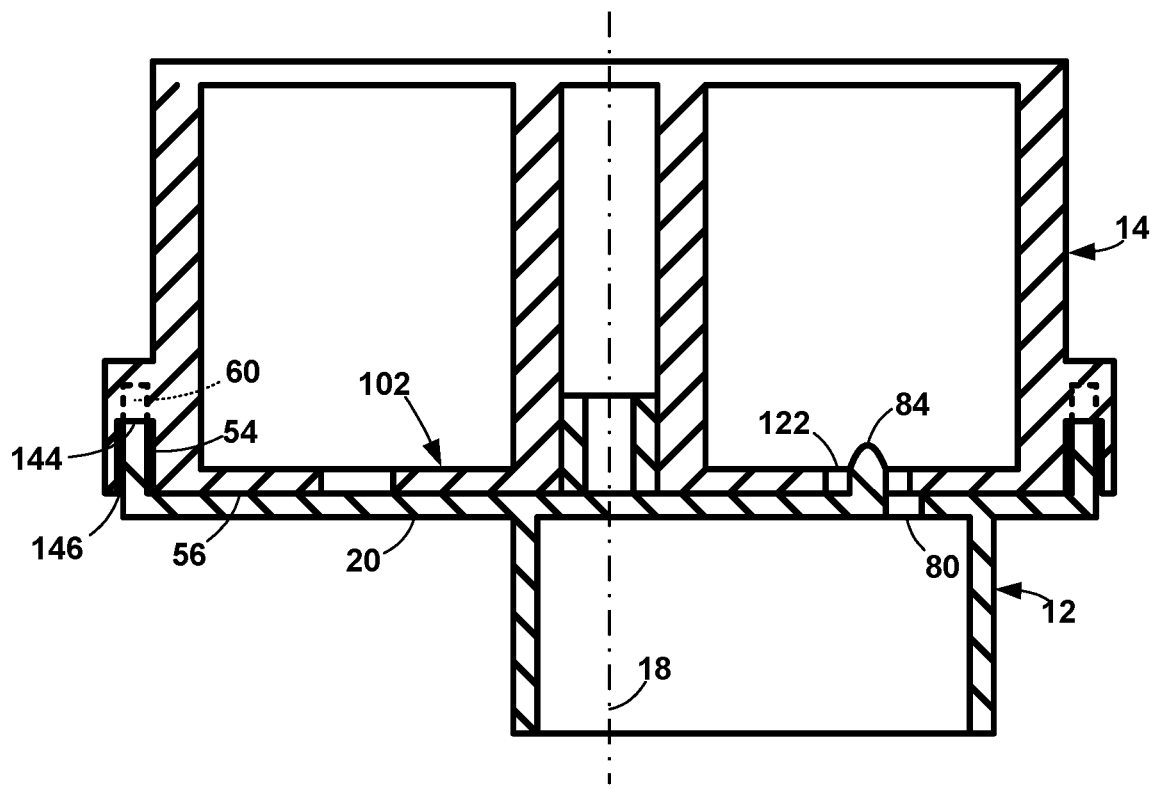
FIG. 31 is a side, cross-sectional view of how the tank and base of the cap of FIG. 4 fit together.

In the tank configuration of FIG. 26, with the platform region 106 within the annular groove 146, the region wall 102 of the tank 14 fits into the platform tray 56, as can be seen in FIG. 31. One or more cogs 144 extend downwardly into the groove 146. The tank 14 fits into the platform tray 56 such that the cogs 144 ride on the teeth 60, as described below.

The tank 14 is attached to the base 12 by an attachment mechanism 16 so that the tank 14 can rotate about and reciprocate relative to the base 12 on the axis 18. The present invention contemplates several different attachment mechanisms 16.

The attachment mechanism 16 of FIG. 32 has an axial hole 136 through the tank cover 130, if there is one, an axial hole 154 through the tank 14, and an axial hole 152 through the platform 20. A pin 164, comprised of a shaft 156, a head 158 at one end of the shaft 156, and threads 160 at the other end of the shaft 156, is inserted, threaded end first, into the cover hole 136, the tank hole 154, and the platform hole 152 until the head 158 is abutting the cover 130/tank 14. A nut 162 is turned onto the threads 160 to retain the pin 164 in the holes 136, 152, 154.

Figure 33:
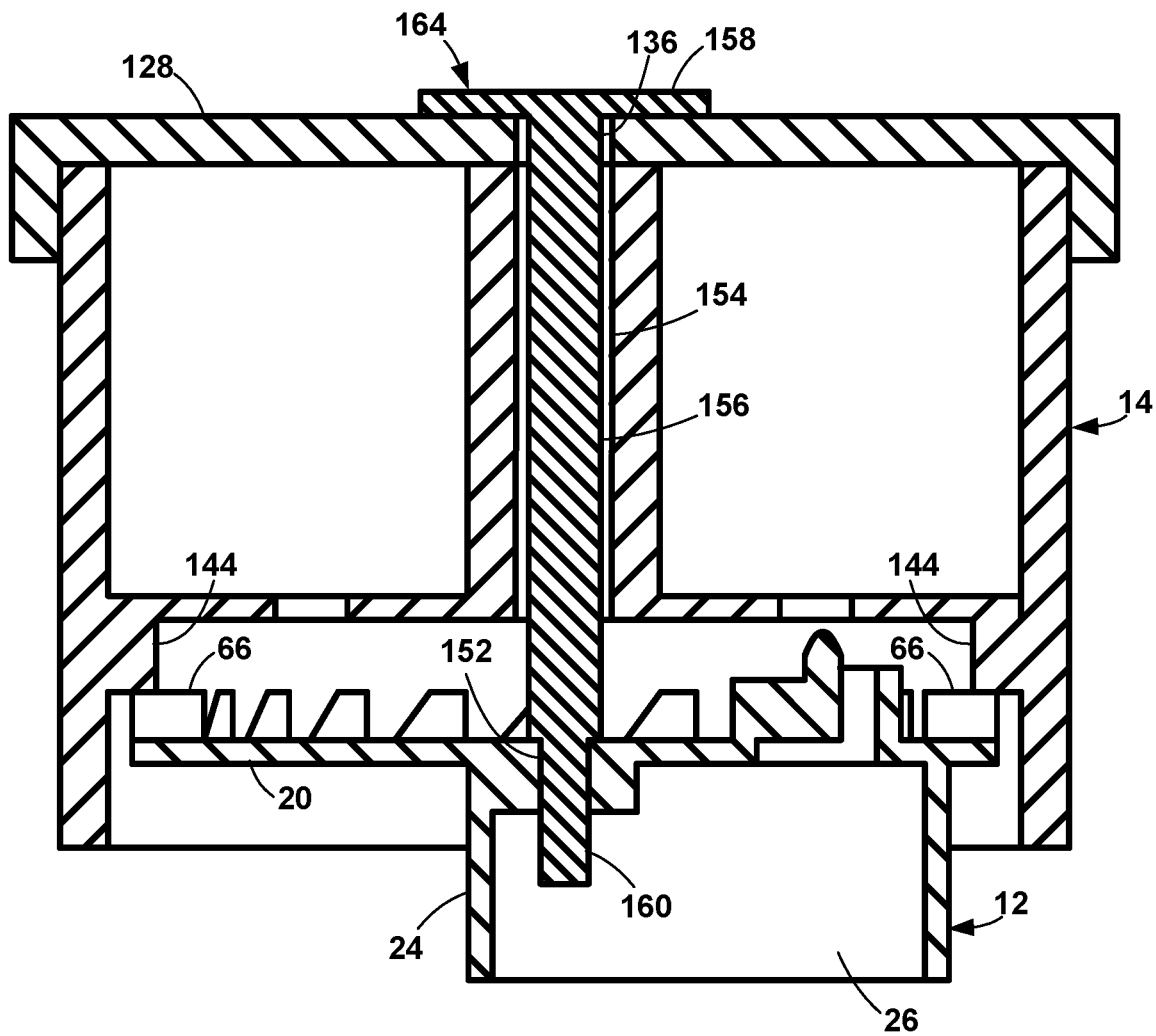
FIG. 33 is a side, cross-sectional view of the cap showing a second attachment mechanism.

In a second attachment mechanism 16, rather than using a separate nut 162, the platform hole 152 is threaded and the shaft threads 160 are turned into the threaded platform hole 152, as in FIG. 33, thereby retaining the pin 164 in the holes 136, 152, 154.

Figure 34:
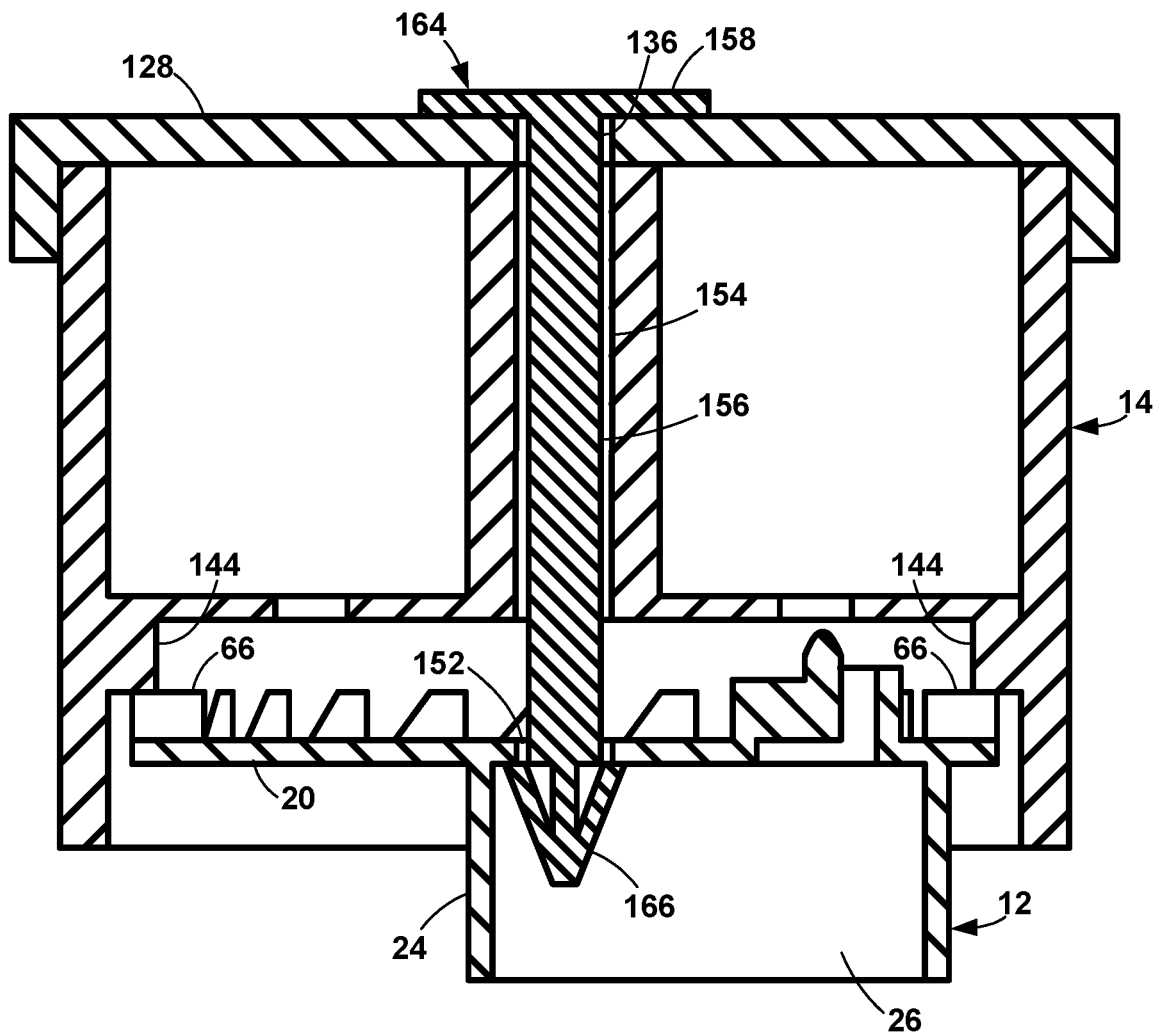
FIG. 34 is a side, cross-sectional view of the cap showing a third attachment mechanism.

In a third attachment mechanism 16, rather than threads 160 and a nut 162, the end of the pin 164 has flared fingers 166, as in FIG. 34. The finger end of the pin 164 is pushed through the holes 136, 152, 154. When in the holes 136, 152, 154, the fingers 166 are forced inwardly. When the fingers 166 clear the platform hole 152, the fingers 166 snap back out, thereby retaining the pin 164 in the holes 136, 152, 154.

Figure 44:
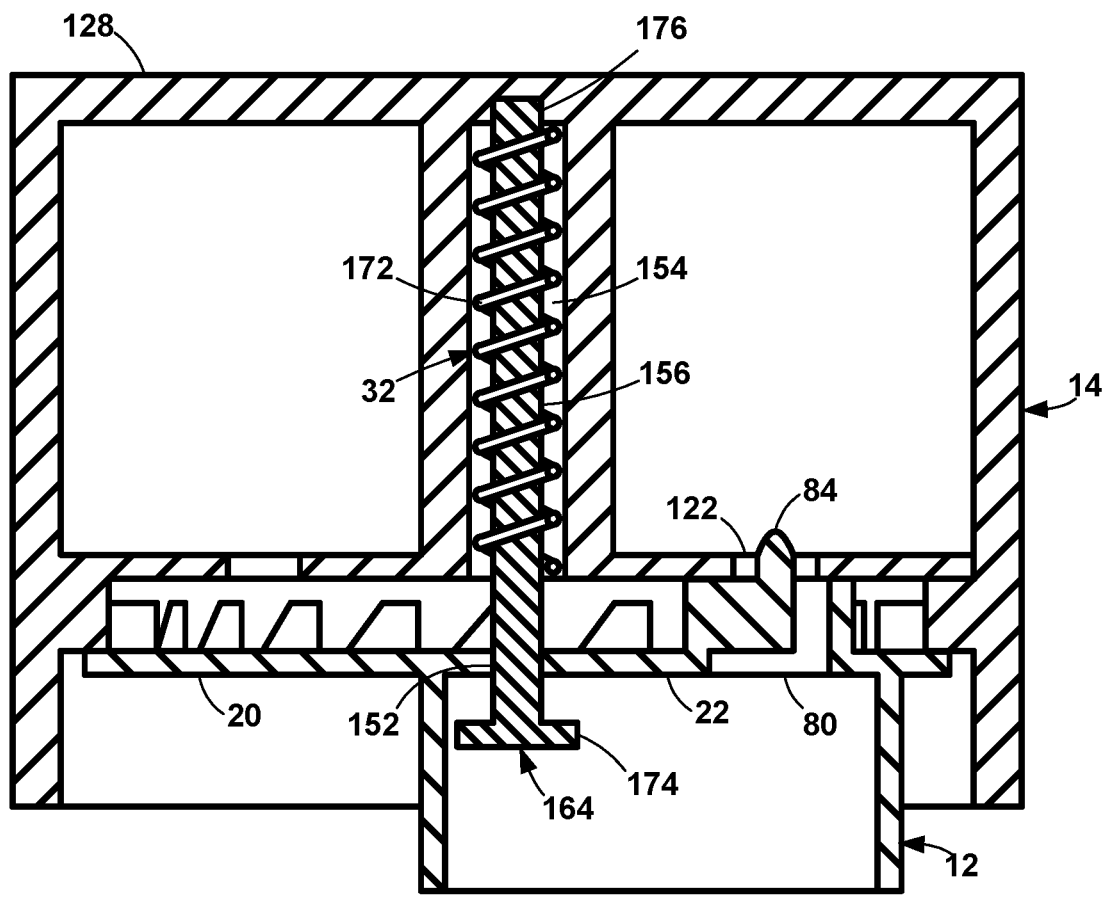
FIG. 44 is a side, cross-sectional view of the cap with a coil spring in the operative position.

A fourth attachment mechanism 16, shown in FIG. 44, has an axial hole 152 through the platform 20, and an axial hole 154 through the tank 14 to an attachment 176 in the tank cover 130. A pin 164, comprised of a shaft 156 and a head 174 at one end of the shaft 156, is inserted upwardly through the platform hole 152 and the tank hole 154, and attached to the cover 130, as at 176. The attachment 176 can be by any adequate means such as by threads or adhesive.

Figure 45:
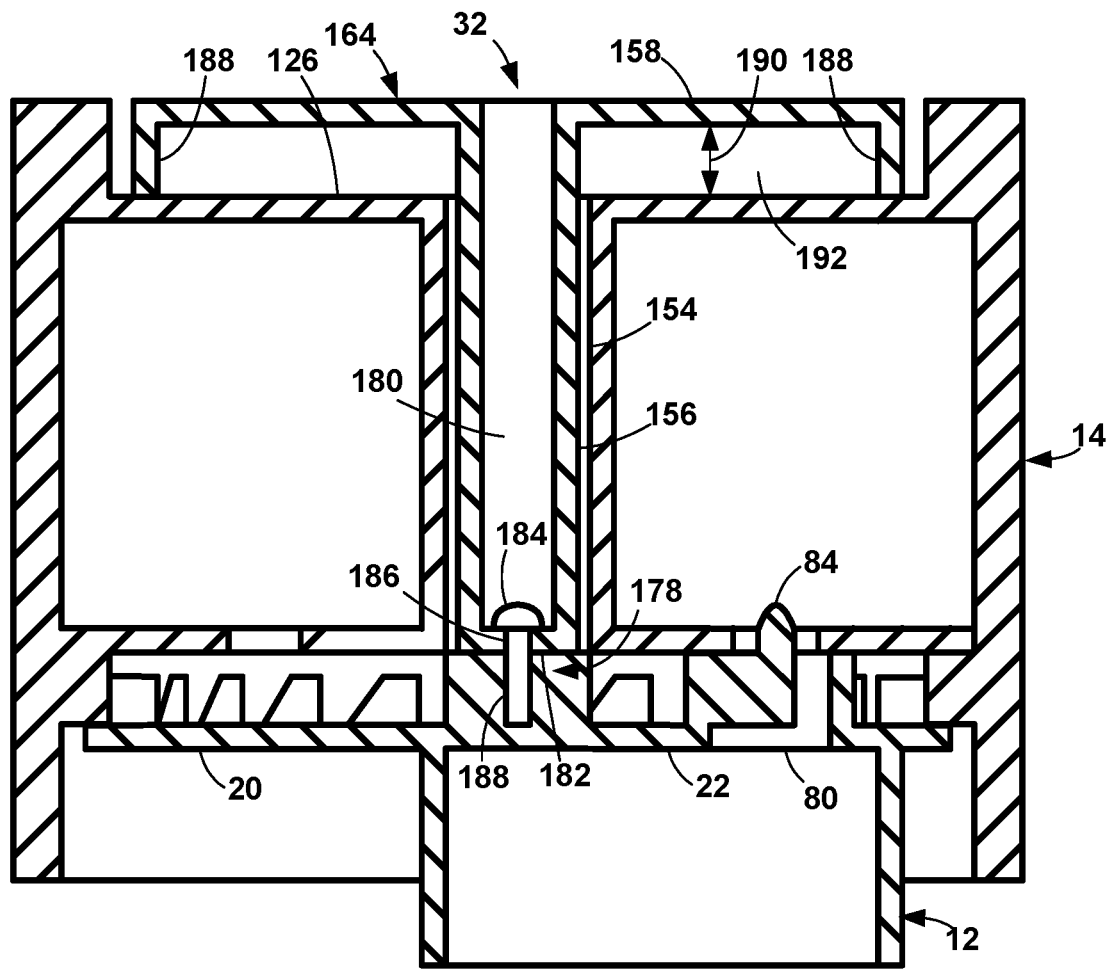
FIG. 45 is a side, cross-sectional view of another cap with a flexible head in the operative position.

A fifth attachment mechanism 16, shown in FIG. 45, has an axial hole 154 through the tank 14. A pin 164, comprised of a shaft 156 and a head 158 at one end of the shaft 156, is inserted downwardly through the tank hole 154 and attached to the platform 20, as at 178. The attachment 178 can be by any adequate means such as by threads or adhesive. In the attachment 178 of FIG. 45, an axial hollow 180 extends through the head 158 and shaft 156 to a stop 182 at the bottom of the shaft 156. A screw 184 is inserted down the hollow 180 through a hole 186 in the stop 182 and turned into a threaded hole 188 in the platform 20.

In all of the attachment mechanisms 16, the length of the shaft 156 is such that the tank 14 can reciprocate relative to the base 12 at least enough to rotate. The minimum distance is the height 70 of the teeth 60, that is, the distance from the valley 62 to the plateau 64. This is seen in FIGS. 32-34 as the cogs 144 resting on the tooth plateaus 66.

The size of the shaft head 158 depends on its purpose. If the tank 14 is formed with the compartments 110 covered or covered by a tank cover 130, as described above, the head 158 merely needs to be larger than the cover hole 136 or tank hole 154 to prevent the shaft 156 from falling through the holes 136, 152, 154.

If the tank 14 is formed with the top 118 of the compartments 110 uncovered and a tank cover 130 is not used, the head 158 has a shape and size as described above with reference to the tank cover 130 to act as a tank cover.

Figure 35:
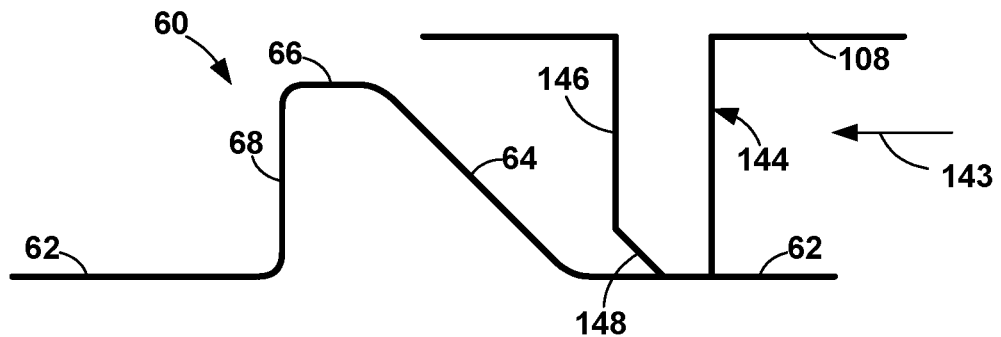
FIG. 35 is a detail, cross-sectional view of the cog in the valley.

When the tank 14 is biased against the base 12 so that the cogs 144 are against the valleys 62 between the teeth 60, the cap 10 is in the operative position, shown in FIG. 35. In the operative position, a compartment opening 122 is fully aligned with the platform aperture 80 and the spike 84 extends through the compartment opening 122.

The present invention contemplates that the biasing mechanism 32 can take several different forms. In the first, the tank 14 is biased against the base 12 by gravity. Because the cap 10 will be on a container and the container will be upright, gravity will push the tank 14 against the base 12. In the second biasing mechanism 32, the tank 14 is manually pushed against the base 12 by the user of the cap 10. In the third biasing mechanism 32, a spring pushes the tank 14 against the cap 12. Several forms of spring-based biasing mechanisms 32 are described below.

Figure 9:
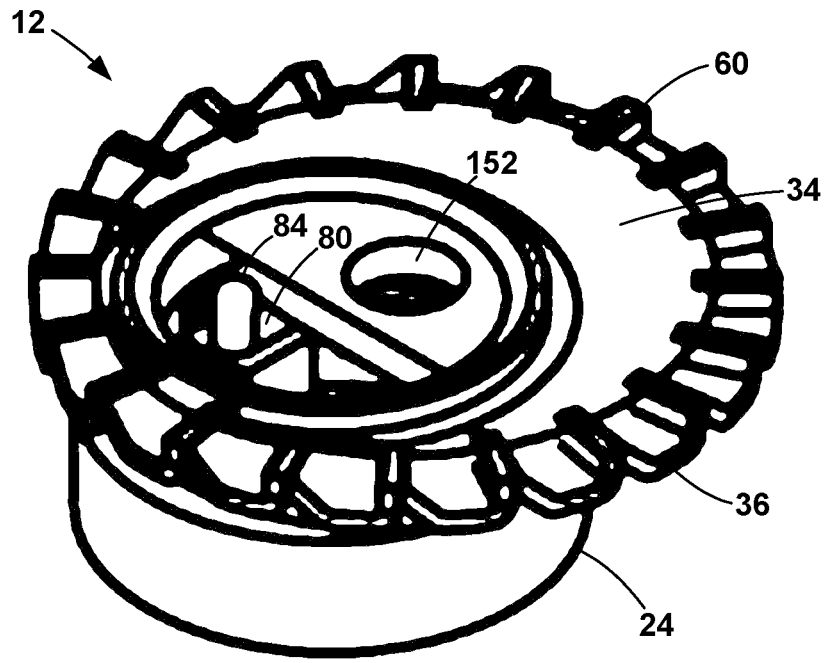
FIG. 9 is a top, perspective view of the base of FIG. 7.
Figure 36:
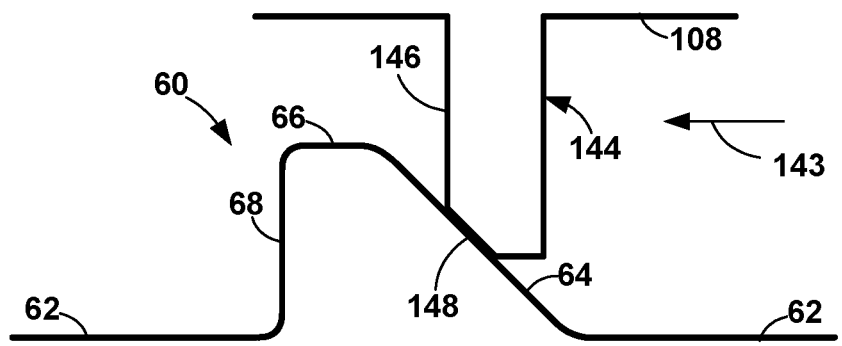
FIG. 36 is a detail, cross-sectional view of the cog on the ramp.
Figure 37:
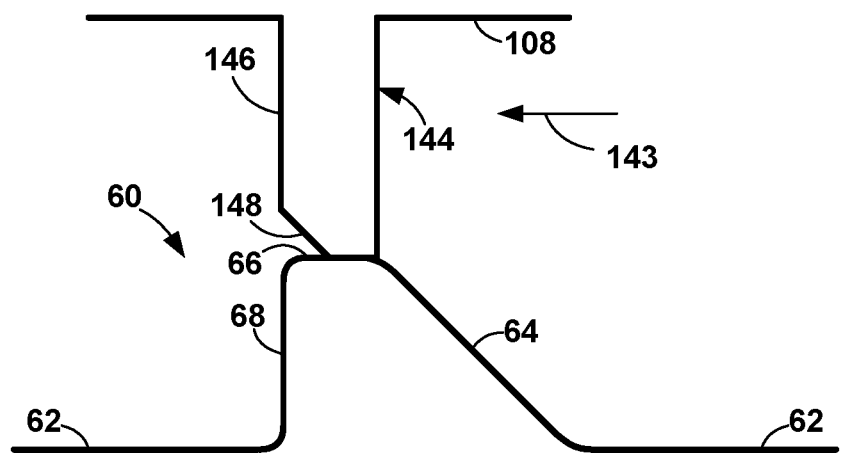
FIG. 37 is a detail, cross-sectional view of the cog on the plateau.
Figure 38:
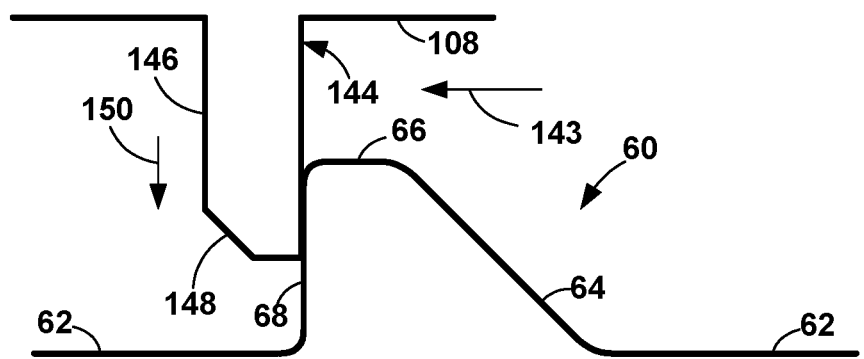
FIG. 38 is a detail, cross-sectional view of the cog past the plateau.
Figure 39:
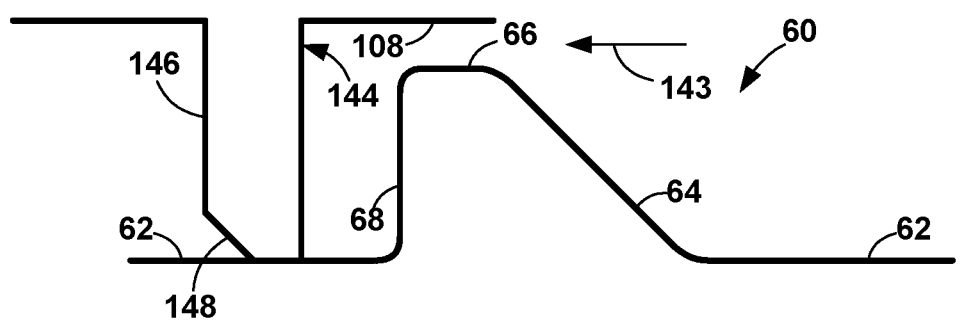
FIG. 39 is a detail, cross-sectional view of the cog in the valley.

The cogs 144 ride on the teeth 60 as the tank 14 is rotated relative to the base 12. When the tank 14 is rotated to the left from the operative position, as at 143, while being acted upon by the biasing mechanism 32, bevels 148 on the leading edge 146 of the cogs 144 slide up the ramps 64 to push the tank 14 away from the platform 20, as in FIG. 36, until the cogs 144 reach the plateaus 66, as in FIG. 37. At this point, the tank 14 is in the selecting position where no compartment opening 122 is fully aligned with the platform aperture 80 and the spike 84 is not in a compartment opening 122. As the tank 14 continues to rotate in the selecting position, the cogs 144 pass the plateaus 66 and reach the vertical walls 68, where the biasing mechanism 32 causes the tank 14 to fall abruptly toward the platform 20 to the operative position, as at 150 in FIG. 38, until the cogs 144 are resting on the valleys 62, as in FIG. 39. As the tank 14 falls to the platform 20 to the operative position, the spike 84 punctures the seal 140 on the opening 122 of the compartment 110 that is aligned with the aperture 80. The spike 84 produces a hole in the seal 140 so that the additive flows around the spike 84 into the aperture 80, through the container attachment 30, and ultimately into the container. The spike 84 can be any shape that can pierce the seal 140. The spike 84 in FIG. 9 is a round rod that comes to a rounded point. The spike 84 of FIG. 10 is has an X-shaped cross-section that comes to a sharp point.

As can be deduced from the above description, the angular displacement 72 between adjacent teeth 60 is the same as the angular displacement 124 between adjacent compartment openings 122. This also means that there are the same number of teeth 60 as there are the total of the number of compartments 110 and vacant locations 112. In the illustrated design, it can be seen in FIGS. 11, 23, and 24 that there are 20 teeth 60, 19 compartments 110, and one vacant location 112. Thus, the angular displacement 72 between adjacent teeth 60 and the angular displacement 124 between adjacent compartments 110 is 360°/20=18°.

The present invention also contemplates that the compartments 110 can extend over various angular displacements 72 in the same tank 14. For example, there are 18 compartments, 9 of which are 25° and 9 of which are 15°. In such a situation, the angular displacements 72 between adjacent teeth 60 are adjusted accordingly and the tank 14 must be installed in the correct angular location on the base 12.

If a vacant location 112 is aligned with the aperture 80 and the tank 14 falls to the operative position, the spike 84 extends into the vacant location 112 where no additive can be added to the container. At this point, the cap 10 is in the closed position for transportation and storage.

Optionally, the design of the attachment mechanism 16 produces friction that acts against the cap 10 inadvertently moving between the selecting position and the operative position and/or against rotating the tank 14 on the base 12 without manual intervention. Friction helps prevent undesired additives from being inadvertently added to the container. The present invention contemplates that any method of producing friction can be incorporated. Possible methods include sizing the components of the attachment mechanism 16 so that it takes some manual force to move one against the other and adding a component such as an annular ring to the shaft 156 that rubs against the surface of the platform hole 152.

The spring-based biasing mechanism 32 retains the tank 14 in the operative position to prevent inadvertent rotation of the tank 14.

Figure 40:
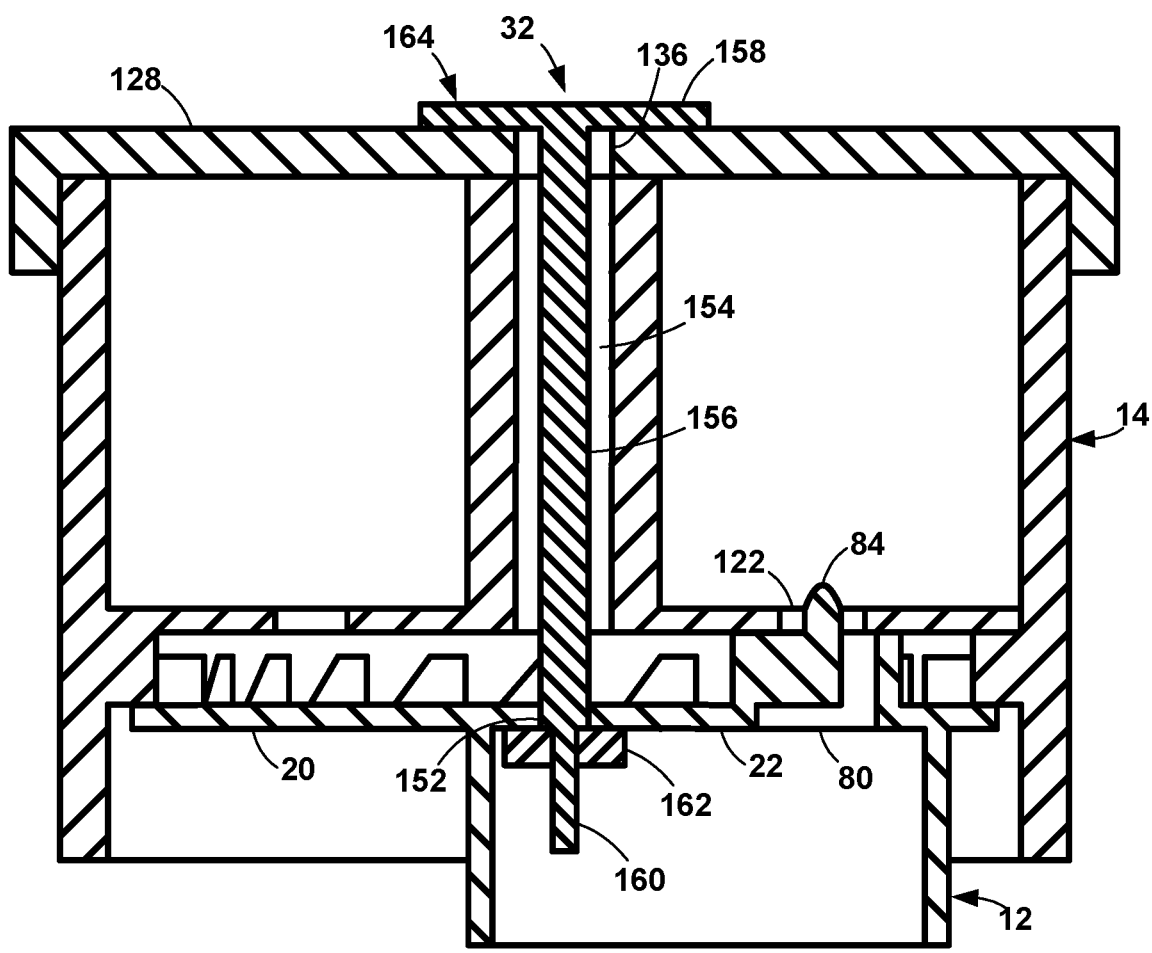
FIG. 40 is a side, cross-sectional view of the cap with a flexible head in the operative position.
Figure 41:
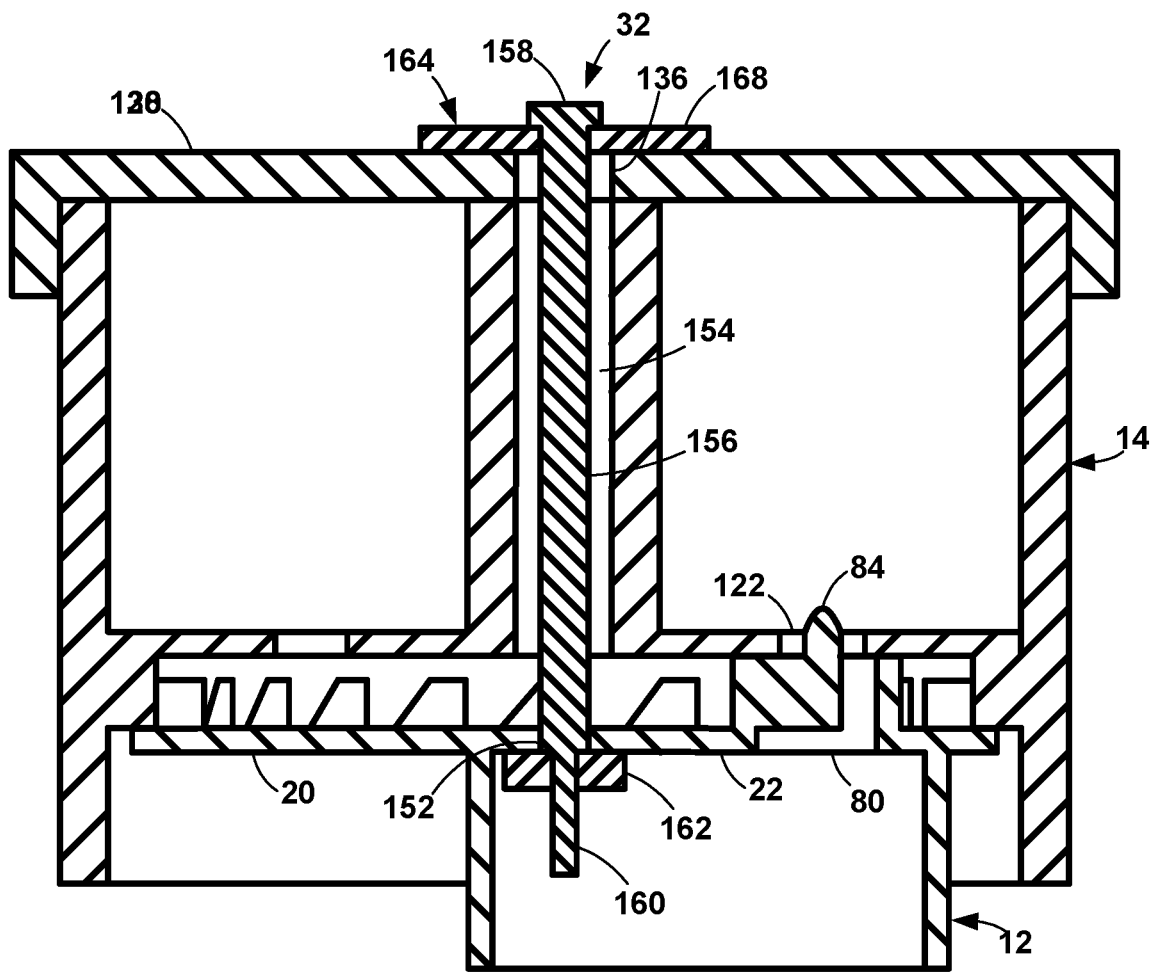
FIG. 41 is a side, cross-sectional view of the cap with a flexible washer in the operative position.
Figure 42:
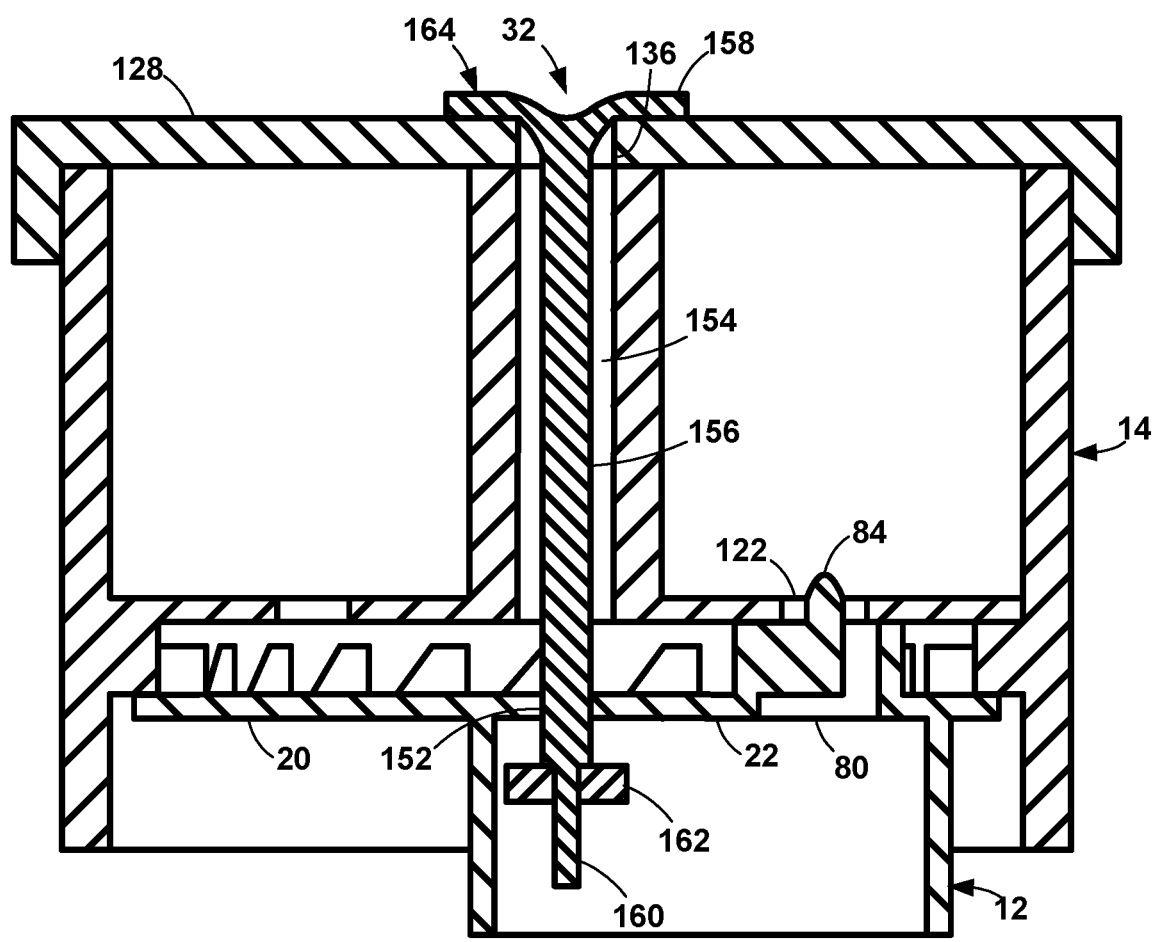
Figure 43:
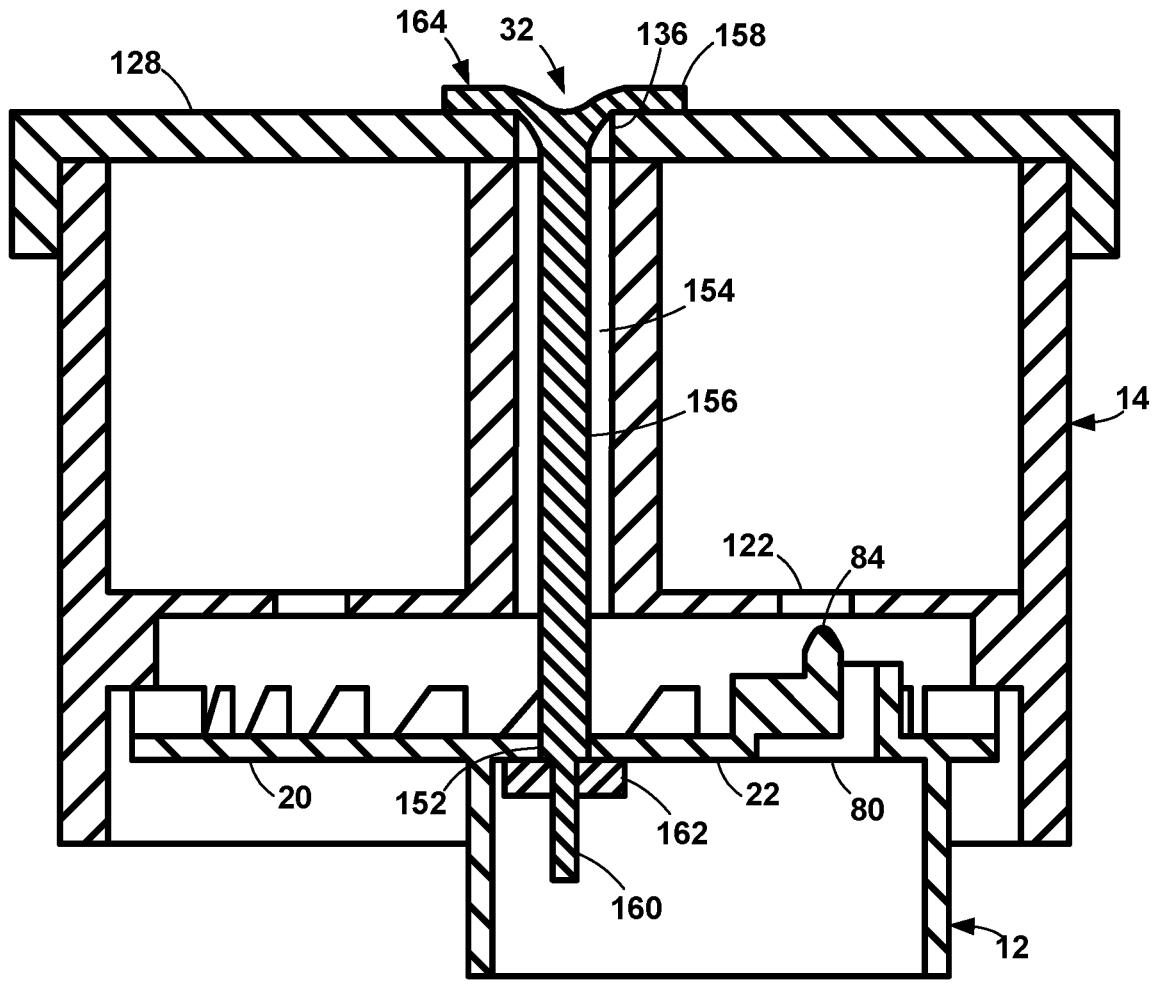
FIG. 43 is a side, cross-sectional view of the cap with a flexible head in the selecting position.

In one configuration, the tank 14 is held in the operative position by the shaft head 158 flush against the tank cover 130 and the nut 162 flush against the base platform bottom 22, as in FIG. 40. The head 158 is composed of a somewhat flexible material, as in FIG. 40, or the head 158 includes a somewhat flexible washer 168, as in FIG. 41. When the tank 14 is in the operative position, the head 158 is in its quiescent state, that is, substantially unflexed. The quiescent state of the head 158 can include a slight preload, where the head 158 is slightly flexed. When the center of the head 158 is manually pushed into the cover hole 136 or when the tank 14 is rotated left to pull it away from the base 12, the head 158 deforms inwardly, as in FIG. 42. The shaft 156, in essence, becomes longer. As in FIG. 43, this allows the tank 14 to reciprocate away from the platform 20 as it rotates to the selecting position, as described above. When the cog 144 reaches the vertical wall 68, the head 158 returns to its quiescent state, as in FIG. 40, to pull the tank 14 down to the base 12 to the operative position. The flexibility of the head 158 determines how strongly the tank 14 is pulled to the base 12. It is flexible enough so that a moderate manual rotating force will cause the head 158 to deform into the hole 136.

In another configuration, shown in FIG. 44, the shaft 156 is attached to the cover 130, as at 176. The attachment 176 can be by adhesive, threads, molding, or any other adequate means. Alternatively, the shaft 156 can be an integral component of the tank 14. The other end of the shaft 156 has a head 174 that prevents the tank 14 from being pulled from the base 12. A stretched coil spring 172, in its quiescent state, acts as the biasing mechanism 32 to hold the tank 14 in the operative position. When the tank 14 is rotated left to pull it away from the base 12 to the selecting position, the spring 172 is stretched more. When the cogs 144 reach the vertical walls 68, the spring 172 returns to its quiescent state, pulling the tank 14 down to the base 12 to the operative position.

Figure 46:
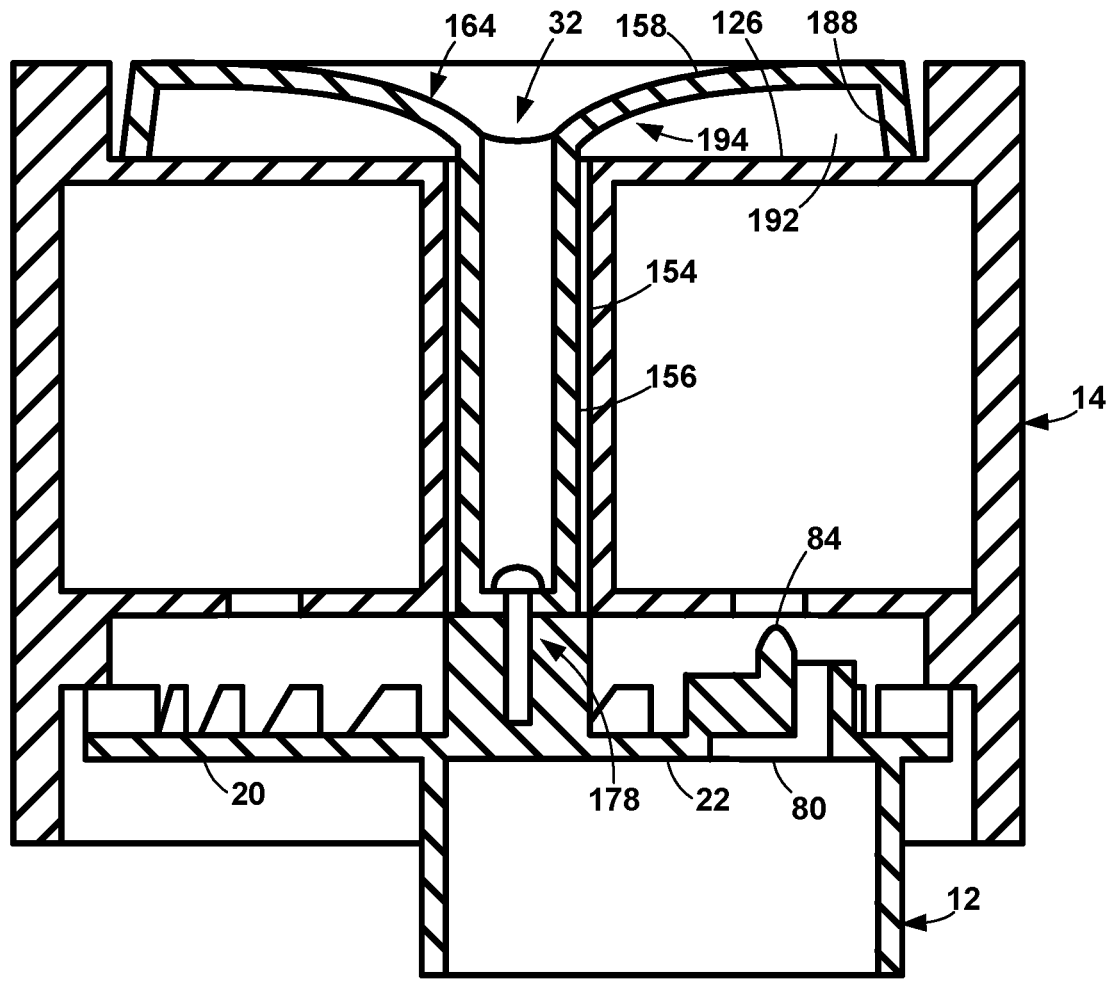
FIG. 46 is a side, cross-sectional view of the cap with a flexible head of FIG. 45 in the selecting position.

In another configuration, shown in FIGS. 45 and 46, the head 158 of the pin 164 is composed of a somewhat flexible material that acts as the biasing mechanism 32 to bias the tank 14 against the base 12. As described above, the shaft 156 extends through a hole 154 in the tank 14 to the platform 20, and the end of the shaft 156 is attached to the platform 20, as at 178. A skirt 188 extends downwardly from the perimeter of the head 158 to rest on the top of the tank 14. The skirt 188 spaces the head 158 a distance 190 above of the tank 14, forming a gap 192 between the head 158 and the top of the tank 14. The head 158 is in its quiescent state when the gap 192 is at its largest.

When the center of the head 158 is manually pushed toward the tank hole 154 or when the tank 14 is rotated left to pull it away from the base 12, the head 158 deforms into the gap 192, as at 194 in FIG. 46, allowing the tank 14 to reciprocate away from the platform 20 as it rotates in the selecting position. When the cog 144 reaches the vertical wall 68, the head 158 returns to its quiescent state, pulling the tank 14 down to the base 12 to the operative position. The flexibility of the head 158 determines how strongly the tank 14 is pulled to the base 12. It is flexible enough so that a moderate manual rotating force will cause the head 158 to deform toward the tank hole 154.

Alternatively, rather than merely rotating the tank 14 so that the cog 144 on the tooth 60 pulls the tank 14 form the base 12, the tank 14 is manually pulled away from the base 12. The head 158 flexes into the cover hole 136 or the spring 172 stretches, thereby allowing the tank 14 to rotate any number of teeth 60.

Optionally, the outside 76 of the tank 14 is designed to be gripped by a person so that it can be rotated. The present invention contemplates any adequate means to do so. One method is to provide textured patches to grasp. Another method is to provide concave patches for fingers.

FIGS. 47-52 show one configuration of the cap 10 of the present invention modified to inject carbon dioxide ($CO_2$) into a container.

The shaft 156 is hollow, as at 196, and extends downwardly through the platform 20 and into the container when the cap 10 is attached to the container.

A $CO_2$ cartridge 202 mounts upright in a cartridge canister 200 that attaches to the top of the tank 14. Preferably, the canister 200 screws onto the top of the tank 14, as at 204, but other methods of attachment are contemplated.

A $CO_2$ valve 206 screws onto the cartridge 202. The valve 206 is actuated by depressing an integral plunger 208. The plunger 208 is manually pushed by a button 210 at the top of the canister 200. The figures show a simple button 210 at the top of the canister 200. However, the present invention contemplates that any type of mechanism that can be employed to depress the plunger 208.

The valve outlet 214 is connected to the hollow 196 of the shaft 156 by a tube 216. The cartridge 202 sits on a rigid plate 212 above the shaft head 158 that covers the tube 216 and shaft hollow 196.

$CO_2$ is injected into the shaft hollow 196 by pushing the button 210. The button 210 pushes the combination of the cartridge 202, valve 206, and shaft 156 downwardly. When pushed fully downwardly, the valve 206 opens to inject $CO_2$ into the shaft hollow 196 and the tank 14 can be rotated on the base 12 to the next compartment 110. When the button 210 is released, the valve 206 closes and the compartment 110 is pierced and tank 14 locked in position.

If it is desired that the two actions, valve 206 open and tank 14 rotation, occur in a sequence, the strength of the two springs in the system can be adjusted appropriately. The valve spring 218 is in the valve plunger 208 and causes the valve 206 to close when pressure is removed from the button 210. The other spring is the flexible shaft head 158, as explained above. If the valve spring 218 is weaker than the shaft head 158, pushing the button 210 partially down will open the valve 206 before the tank 14 can be rotated, as at 222 in FIG. 49. Pushing the button 210 fully down will allow the tank 14 to be rotated, as at 224 in FIG. 51. If the valve spring 218 is stronger than the shaft head 158, pushing the button 210 partially down will allow the tank 14 to be rotated before the valve 206 opens, as in FIG. 50. Pushing the button 210 fully down will open the valve 206, as in FIG. 51.

Figure 52:
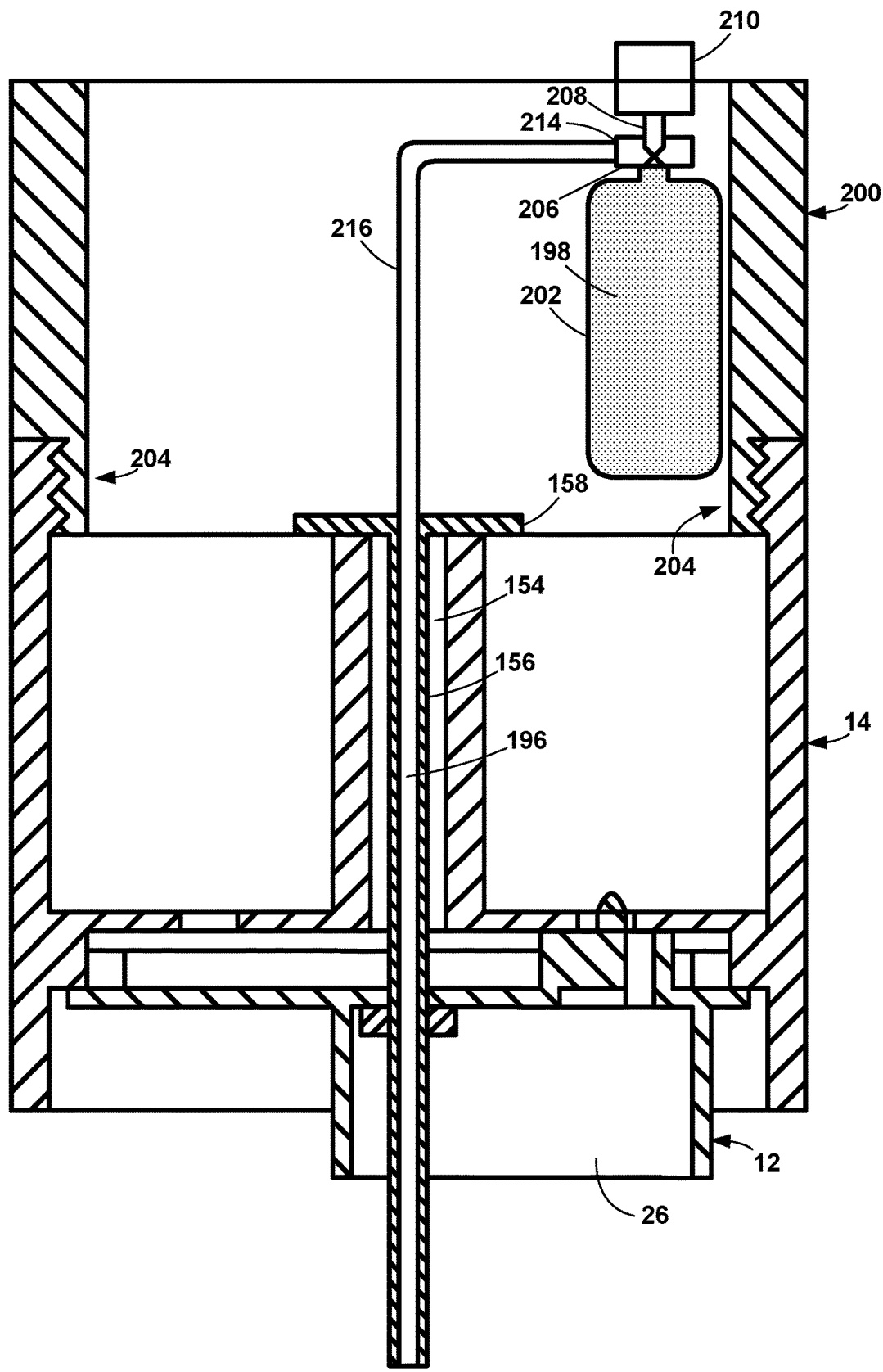
FIG. 52 is a side, cross-sectional view of another configuration the cap with a flexible head and a $CO_2$ cartridge.

FIG. 52 shows another configuration of the cap 10 of the present invention modified to inject $CO_2$ into a container. The shaft 156 is hollow, as at 196, and extends downwardly through the cavity 26 and into the container when the cap 10 is attached to the container.

A $CO_2$ cartridge 202 mounts upright in a cartridge canister 200 that attaches to the top of the tank 14. Preferably, the canister 200 screws on to the top of the tank 14, as at 204, but other methods of attachment are contemplated.

The cartridge 202 screws into a valve 206 that is mounted to the top of the canister 200 so that the cartridge 202 is suspended from the valve 206. The cartridge 202 can be located anywhere within the canister 200, such as on the side, as in FIG. 52, or in the center over the shaft head 158.

The valve outlet 214 is connected to the hollow 196 of the shaft 156 by a tube 216. The valve 206 is actuated by pushing down on its plunger 208. The plunger 208 is manually pushed by the button 210 at the top of the canister 200 to open the valve 206 to inject $CO_2$ into the shaft hollow 196. When the button 210 is released, the valve 206 closes.

The tank 14 can be rotated by pulling the tank 14 away from the base 12, as described above. Since the rotation and carbonation mechanisms are independent of each other, they can be performed one before the other or at the same time.

Figure 47:
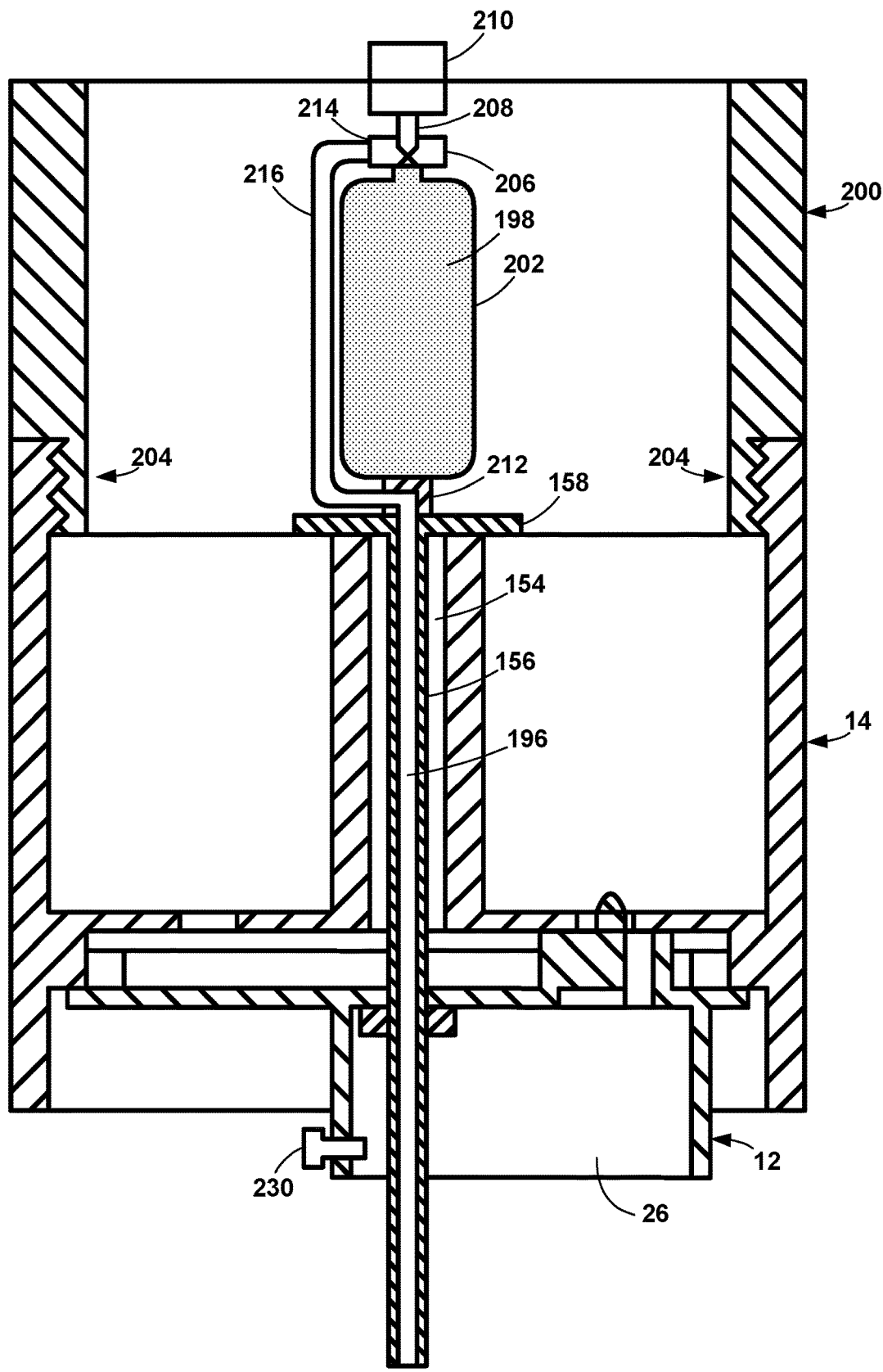
FIG. 47 is a side, cross-sectional view of one configuration the cap with a flexible head and a $CO_2$ cartridge.
Figure 48:
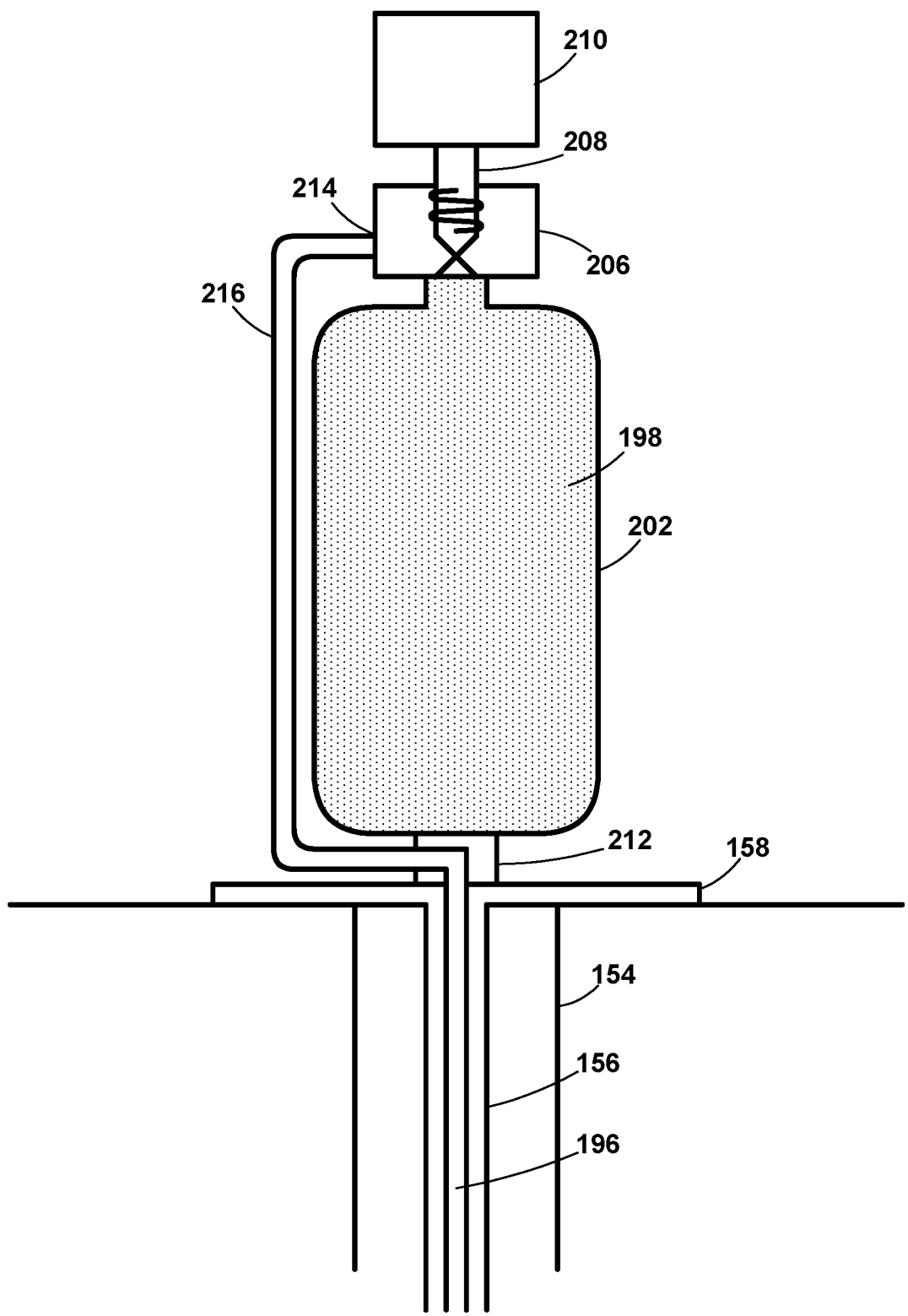
FIG. 48 is a side, cross-sectional, detail view of the cap with a flexible head and a $CO_2$ cartridge in the normal position.
Figure 49:
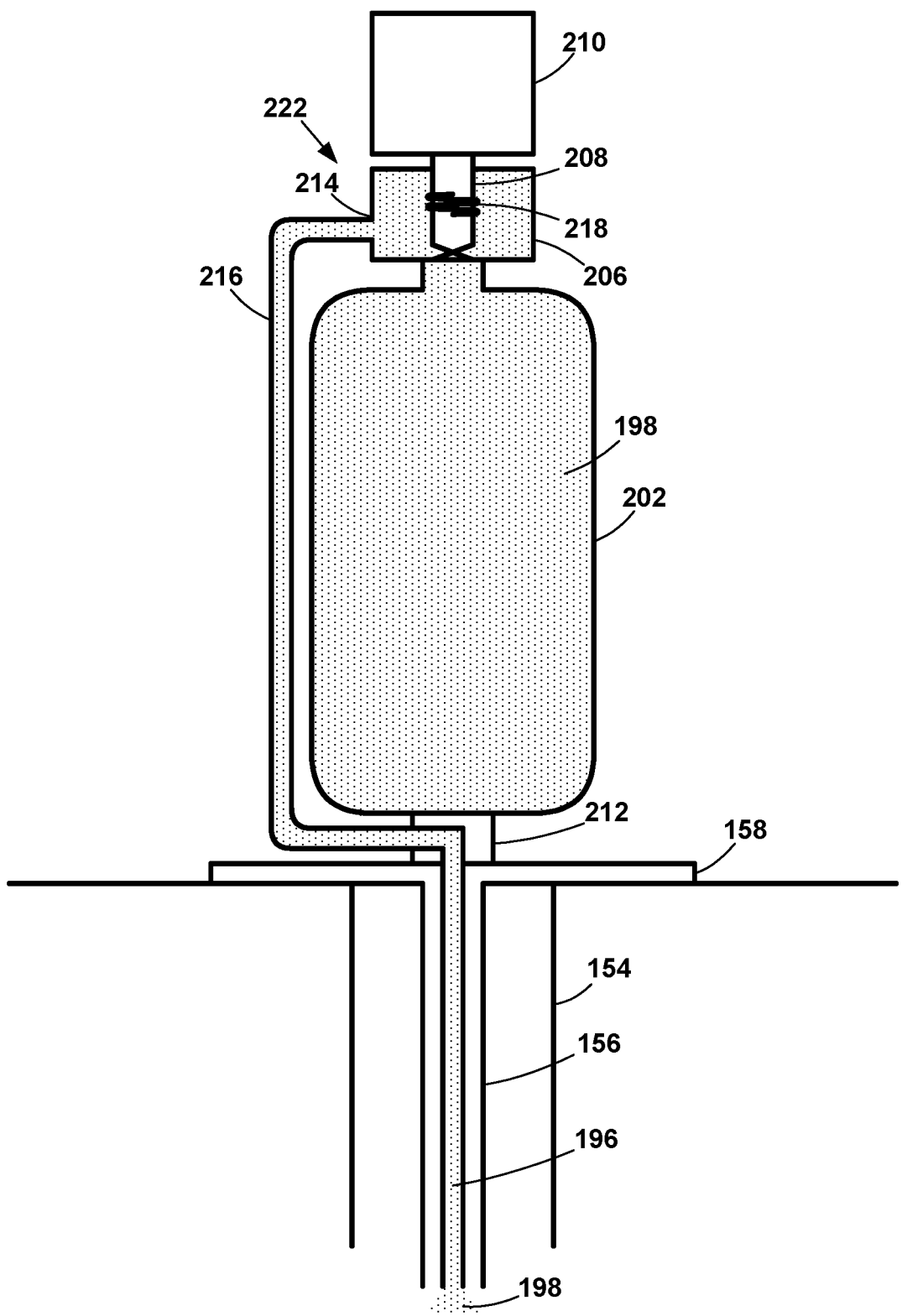
FIG. 49 is a side, cross-sectional, detail view of the cap with a flexible head and a $CO_2$ cartridge with the button partially pushed to release the $CO_2$ only.
Figure 50:
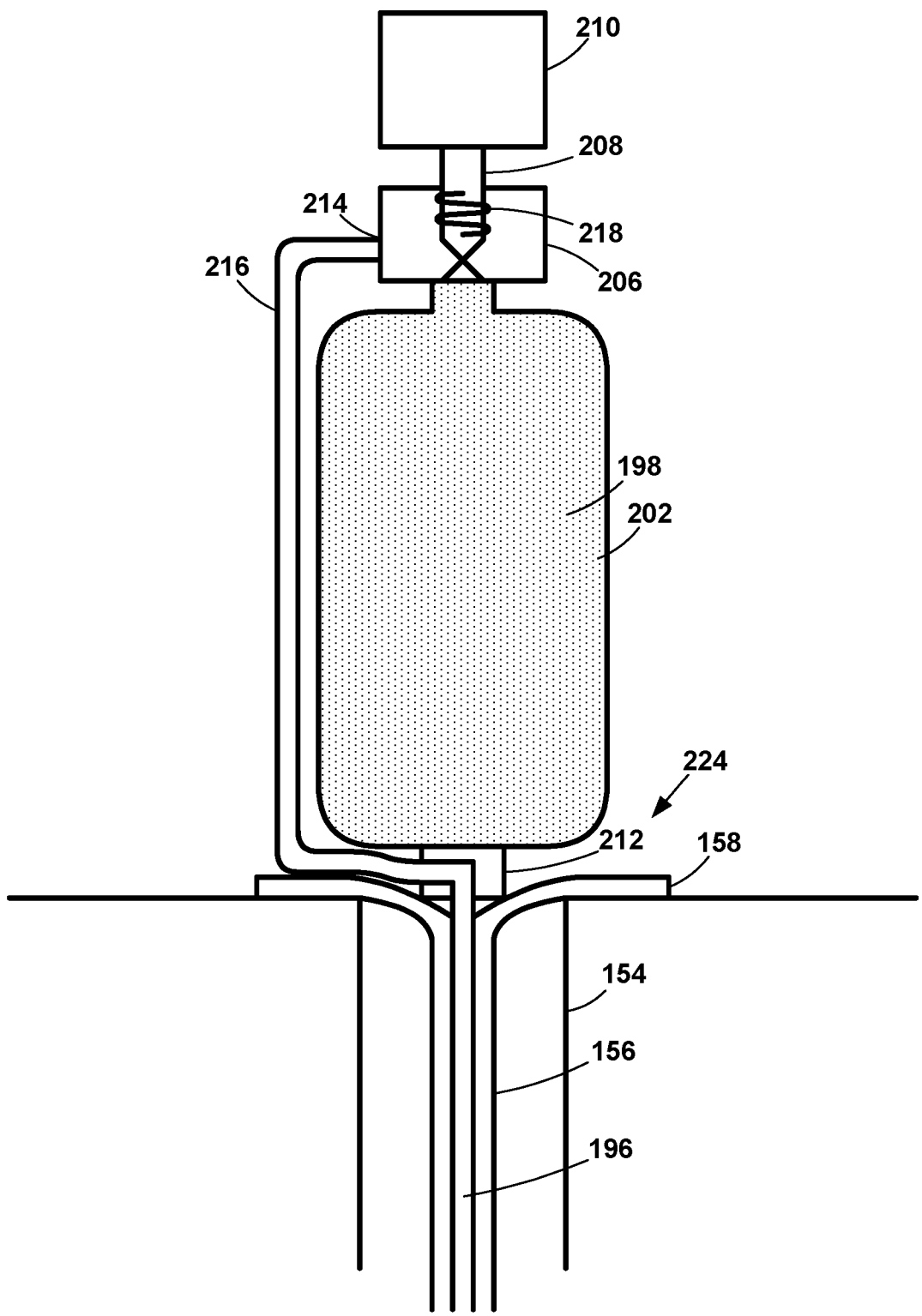
FIG. 50 is a side, cross-sectional, detail view of the cap with a flexible head and a $CO_2$ cartridge with the button partially pushed to rotate the tank only.
Figure 51:
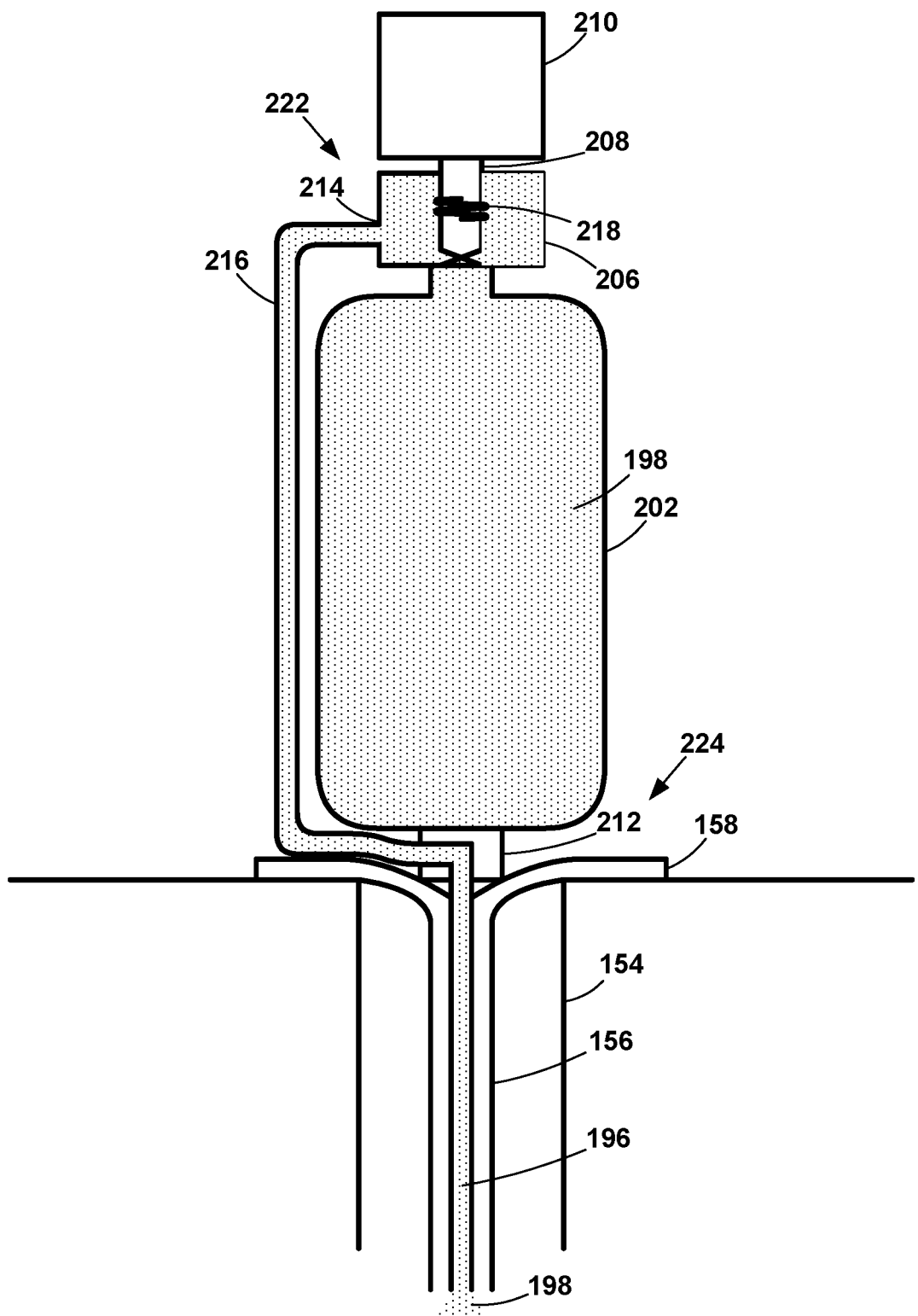
FIG. 51 is a side, cross-sectional, detail view of the cap with a flexible head and a $CO_2$ cartridge with the button fully pushed to release the $CO_2$ and rotate the tank.

Optionally, the cap 10 includes a pressure relief valve 230 so that the container is not over pressurized. The valve 230 is located where the pressure within the container can be sensed when the cap 10 is secured to the container, which includes anywhere from the $CO_2$ valve 206 to the cavity 26. In FIG. 47, the pressure relief valve 230 is shown in the cavity 26. If the pressure relief valve 230 is within the canister 200, the canister needs a hole to vent any $CO_2$ released by the pressure relief valve 230. The pressure relief valve 230 should release at the maximum pressure desired in the container, typically in the range of from 15 to 60 pounds per square inch (psi).

Thus, it has been shown and described a container cap with selectable additives. Since certain changes may be made in the present disclosure without departing from the scope of the present invention, it is intended that all matter described in the foregoing specification and shown in the accompanying drawings be interpreted as illustrative and not in a limiting sense.

The invention claimed is:

1. A cap for a container with an opening, the cap comprising:
    (a) a base having a round platform with an axis, a platform top surface with a perimeter, a platform bottom surface, a container attachment on the platform bottom surface, and a through aperture extending from the platform top surface to the platform bottom surface;
    (b) a cylindrical tank having a region wall dividing the tank into a compartment region with a top having a closure, and a platform region, the compartment region including a plurality of compartments and at least one vacant location arranged in a circle around the axis, each compartment having a compartment through opening in the region wall covered by a frangible seal, at least one of the compartments containing an additive, the at least one vacant location not containing an additive, the tank mounted to the base by an attachment mechanism such that the tank rotates about and reciprocates on the axis relative to the base, the tank being rotatable on the axis such that the compartment through openings and the at least one vacant location can align with the through aperture;
    (c) a spike extending from the through aperture toward the region wall;
    (d) a biasing mechanism biasing the tank toward the base;
    (e) a series of truncated teeth extending upwardly from around the platform perimeter above the top surface of the platform into the platform region, a profile of each tooth having a generally flat valley, a ramp extending upwardly at an angle from the valley to a plateau, to a vertical wall, and down to the valley of the adjacent tooth;
    (f) at least one cog extending downwardly into the platform region to ride on the teeth; and
    (g) the tank rotating and reciprocating on the axis between a selecting position wherein the at least one cog ride up the ramps to the plateaus, thereby pulling the tank away from the base against the biasing mechanism, and an operative position wherein the biasing mechanism causes the at least one cog to drop down the vertical walls to the valleys, thereby causing the spike to pierce the frangible seal associated with a compartment aligned with the through aperture, thereby allowing the additive to flow downwardly into the through aperture and into the container attachment.

2. The cap of claim 1, wherein the container attachment includes a cavity that is threaded for attachment to a screw-top container.

3. The cap of claim 1, wherein the container attachment includes a cavity with a snap-on attachment for the container.

4. The cap of claim 1, wherein the container attachment includes a pair of opposed finger grips extending downwardly from the platform bottom surface.

5. The cap of claim 1, wherein the frangible seal is a thin sheet attached to the region wall by an adhesive.

6. The cap of claim 5, wherein each compartment through opening has its own thin sheet.

7. The cap of claim 5, wherein a single thin sheet covers all of the compartment through openings.

8. The cap of claim 1, wherein the tank is composed of a tank material and the frangible seal is a thin sheet of the tank material.

9. The cap of claim 1, wherein the compartments are all the same size.

10. The cap of claim 1, wherein the platform region is within an annular groove on the outside of the tank.

11. The cap of claim 1, wherein the tooth ramp is at an angle in the range of from approximately 30° to approximately 60°.

12. The cap of claim 1, wherein the attachment mechanism includes a pin with a shaft and head, the shaft extending through an axial through hole in the tank and secured to the base with the head abutting a top of the tank.

13. The cap of claim 12, wherein the biasing mechanism includes the head being flexible, whereby, when the tank is in the operative position, the head is in a quiescent state, and when the tank is in the selecting position, the head is deformed toward the tank.

14. The cap of claim 13, wherein the pin has a skirt extending from the head that rests on the top of the tank, forming a gap between the tank top and the head, whereby, when in the selecting position, the head is deformed into the gap.

* * * * *